United States Patent [19]
Ichikawa et al.

[11] Patent Number: 5,860,029
[45] Date of Patent: Jan. 12, 1999

[54] CAMERA SYSTEM HAVING A FLASH DEVICE CAPABLE OF PERFORMING A HIGH SPEED SYNCHRONIZED PHOTOGRAPHY

[75] Inventors: Tsutomu Ichikawa, Hashimoto; Shigeto Ohmori, Kawachinagano; Motoshi Yamaguchi; Hiroshi Ootsuka, both of Sakai; Keizo Kioku, Nara; Atsuhisa Ohno, Sakai, all of Japan

[73] Assignee: Minolta Co., Ltd., Osaka, Japan

[21] Appl. No.: 801,453

[22] Filed: Feb. 18, 1997

Related U.S. Application Data

[63] Continuation of Ser. No. 326,719, Oct. 20, 1994, abandoned.

[30] Foreign Application Priority Data

Oct. 20, 1993 [JP] Japan .................................. 5-262577
Oct. 22, 1993 [JP] Japan .................................. 5-264989

[51] Int. Cl.$^6$ .............................. G03B 15/02; G03B 15/03
[52] U.S. Cl. ........................... 396/61; 396/108; 396/164
[58] Field of Search .................................. 396/172, 164, 396/106, 108, 61

[56] References Cited

U.S. PATENT DOCUMENTS

| | | | |
|---|---|---|---|
| 4,299,464 | 11/1981 | Cushman ................................ | 354/137 |
| 4,354,751 | 10/1982 | Izumi et al. ............................ | 354/139 |
| 4,422,743 | 12/1983 | Izumi et al. ............................ | 354/415 |
| 4,615,599 | 10/1986 | Kataoka et al. ........................ | 354/415 |
| 4,998,128 | 3/1991 | Coltman et al. ........................ | 354/415 |
| 5,051,769 | 9/1991 | Hayashi et al. ........................ | 354/419 |
| 5,144,359 | 9/1992 | Hayashi et al. ........................ | 354/419 |
| 5,239,336 | 8/1993 | Matsui et al. .......................... | 354/416 |
| 5,268,730 | 12/1993 | Takagi .................................... | 354/415 |
| 5,317,362 | 5/1994 | Takahashi ............................... | 354/418 |
| 5,602,614 | 2/1997 | Ohtsuka et al. ........................ | 396/61 |

*Primary Examiner*—Russell Adams
*Assistant Examiner*—Christopher E. Mahoney
*Attorney, Agent, or Firm*—Sidley & Austin

[57] ABSTRACT

A camera system includes a camera device and a flash device. The camera device has a first mode where a control aperture value and a control shutter speed are automatically determined; and a second mode where the operator is allowed to determine either a control aperture value or a control shutter speed. The flash device is capable of emitting an instantaneous flash light and a prolonged flash light. The camera device includes a distance calculator operable to calculate a distance to an object and a light intensity calculator operable to calculate an intensity of a prolonged flash light for flash photography based on the calculated distance, a focal plane shutter having a front blind and a rear blind, and a controller operable to render the flash device emit a prolonged flash light at the calculated intensity from the start of travel of the front blind to the finish of travel of the rear blind.

18 Claims, 19 Drawing Sheets

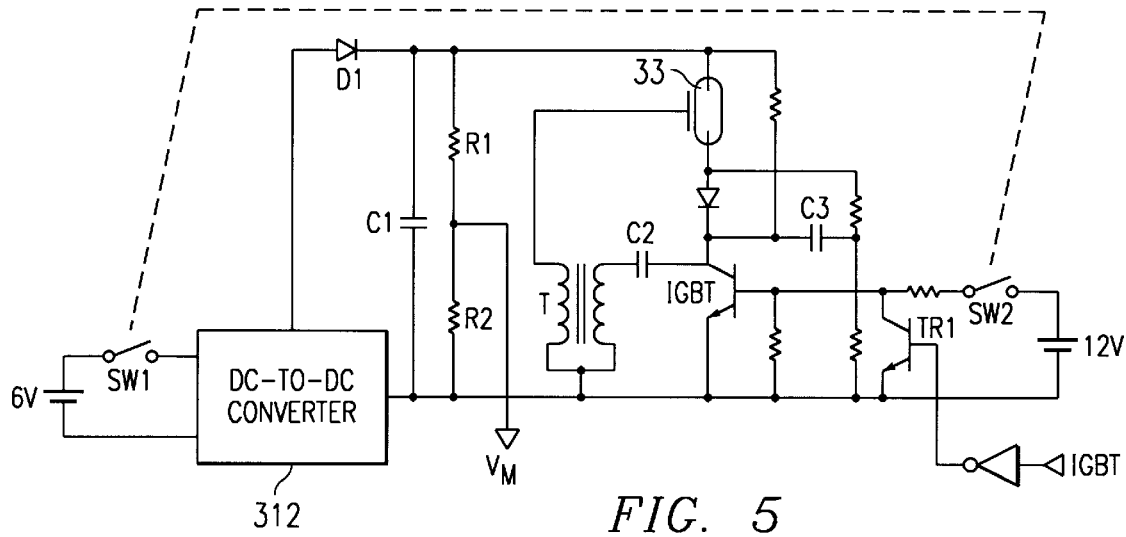

FIG. 5

| FLASH FIRING MODE | | CONTENT OF DATA TRANSMITTED IN STEP S15 | CONTENT OF DATA TRANSMITTED IN STEP S30 | CONTENT OF DATA TRANSMITTED IN STEP S55 | TEST FIRING |
|---|---|---|---|---|---|
| FIRST MODE | FLAT FIRING | IV, SSEN LVtest, LVmax LVmin | DV, TV, AV, FV SV, FLATREQ FLATTIME, NOTFIRE | LVC | ◯ |
| SECOND MODE | PULSE FIRING | IV, SSEN IVtest, IVmax IVmin, LVt | DV, TV, AV, FV SV, FLATREQ FLATTIME, NOTFIRE | IVC | ◯ |
| THIRD MODE | PULSE FIRING | IV, SSEN IVmax, IVmin | DV, TV, AV, FV SV, FLATREQ, IVC FLATTIME, NOTFIRE | NONE | ✕ |
| FOURTH MODE | PULSE FIRING | IV, SSEN IVmax, IVmin | DV, TV, AV, FV SV, FLATREQ, IVC FLATTIME, NOTFIRE | NONE | ✕ |

FIG. 8

CAMERA SYSTEM HAVING A FLASH DEVICE CAPABLE OF PERFORMING A HIGH SPEED SYNCHRONIZED PHOTOGRAPHY

This is a continuation of U.S. patent Ser. No. 08/326,719 filed Oct. 20, 1994, now abandoned.

BACKGROUND OF THE INVENTION

This invention relates to a camera system capable of performing a high speed synchronized photography.

When taking a photograph in a dark place, it has been a common practice to use the auxiliary light emitted from a flash device in combination with the ambient light. However, in the case where a flash photography is executed by a camera having a focal plane shutter, there has been the likelihood that an object is not sufficiently illuminated by the flash light while the gap defined by front and rear blinds of the focal plane shutter travels across a film plane at a shutter speed greater than a flash synchronized shutter speed. In this case, the film plane is exposed partially by the flash light regardless of at which moment the flash device is fired, with the result that a uniformly exposed picture cannot be obtained.

In order to overcome this problem, U.S. Pat. No. 4,422,743 discloses a camera system which causes a flash device to selectively emit a first type of light which flashes instantaneously and a second type of light which flatly flashes for a prolonged period of time. The instantaneous flash light is emitted when a control shutter speed is smaller than the flash synchronized shutter speed. The flat flash light is emitted when a control shutter speed is greater than the flash synchronized shutter speed. Also, the instantaneous and flat flash lights are selectively changed in accordance with the intensity of the ambient light. The intensity and time of the flat flash light are changed in accordance with the control shutter speed.

Japanese Unexamined Patent Publication No. 61-98334 discloses a flash device including a semiconductor switching device which is connected in series with a flash light discharge tube and which is turned on and off at intervals of a minute time to emit flat flash light. Japanese Unexamined Patent Publication No. 64-17033 discloses a flash device which uses IGBT (Insulated Gate Bipolar Transistor) to emit a flat flash light. Similarly to U.S. Pat. No. 4.422,743, these flash devices emit flat flash light when a control shutter speed is greater than the flash synchronized shutter speed.

Further, there have been proposed a camera system which emits flat flash light when an object is closer to the camera than a predetermined distance (U.S. Pat. No. 4,354,751); a camera system which cannot emit flat flash light but can determine an optimal flash light intensity based on the shake limiting shutter speed and the flash synchronized shutter speed (U.S. Pat. No. 5,051,769, U.S. Pat. No. 5,144,359): and a camera system which cannot emit flat flash light but executes a preliminary light emission to calculate an optimal flash light intensity (U.S. Pat. No. 5,268.730).

In the aforementioned conventional camera systems, the flash photography mode is changed between the flat flash photography and the instantaneous flash photography by a manual operation in accordance with the discrimination result of whether or not a control shutter speed is greater than the flash synchronized shutter speed, or in accordance with the discrimination result of whether the photography mode is a macro photography mode or a normal photography mode. In such conventional manners, it has been very difficult to carry out photography which is optimal to reflect an operator's intention and a state of an object.

Further, flash devices used in the conventional camera systems do not calculate an amount of flash light in accordance with an automatic exposure calculation result, a distance to an object and the like. Accordingly, the conventional camera systems have required a skill of a certain level to obtain a picture free from an exposure error. Thus, it has been difficult for a novice to properly use these flash devices.

SUMMARY OF THE INVENTION

It is an object of the invention to provide a camera system which has overcome the above-mentioned drawbacks in the prior art.

The present invention is directed to the following devices.

A camera system comprising: a flash device capable of emitting a prolonged flash light; a first controller communicating with the flash device to cause the flash device to emit a test flash light of a predetermined intensity before executing photography; a first photosensor receiving ambient light reflected from an object to measure a first brightness of the object under ambient light; a second photosensor receiving ambient light and test flash light reflected from the object to measure a second brightness of the object under the test flash light and ambient light; a distance calculator operable to calculate a distance to the object based on the predetermined intensity of the test flash light, the first brightness, and the second brightness; a light intensity calculator operable to calculate a light intensity of flash light for the photography based on the calculated distance and a brightness of the object under flash light; and a second controller communicating with the flash device to cause the flash device to emit a prolonged flash light at the calculated intensity for an exposure time.

A camera system comprise a camera device and a flash device, the camera device including: a test firing signal generator communicating with a test firing controller provided in the flash device to transmit a test firing signal to the test firing controller; a first photosensor receiving ambient light reflected from an object to measure a first brightness of the object under ambient light: a second photosensor receiving ambient light and test flash light reflected from the object to measure a second brightness of the object under the test flash light and ambient light, the test flash light being emitted by the flash device in response to the test firing signal; a distance calculator operable to calculate a distance to the object based on the first brightness, the second brightness, and a test flash light intensity to be transmitted from the flash device; a light intensity calculator operable to calculate a control light intensity of flash light for the photography based on the calculated distance and a brightness of the object under flash light; and a control light intensity transmitter communicating with a main firing controller provided in the flash device to transmit the control light intensity to the main firing controller: a main firing signal generator communicating with the main firing controller to transmit a main firing signal to the main firing controller; and a shutter controller operable to control the operation of a shutter provided in the camera device in synchronism with the transmission of the main firing signal; the flash device including: a flash light emitter capable of emitting a prolonged flash light; the test firing controller, which is responsive to the test firing signal, to cause the flash light emitter to emit the test flash light at the specified intensity; the main firing controller, which is responsive to the control light intensity and the main firing signal, to cause the flash light emitter to emit a main prolonged flash light at the control light intensity; and a test light intensity transmitter communicating with the light intensity calculator to transmit the specified test flash light intensity to the light intensity calculator.

A flash device, which is removably mountable on a camera having a focal plane shutter and capable of generating a test firing signal and a main firing signal, comprises a flash light emitter capable of emitting a prolonged flash light; a first receiver operable to receive the test firing signal; a test firing controller, which is responsive to the test firing signal to cause the flash light emitter to emit a test flash light at a predetermined intensity; a test light intensity transmitter operable to transmit the predetermined light intensity to the camera; a second receiver operable to receive a control flash light intensity for main firing: a third receiver operable to receive the main firing signal; and a main firing controller, which is in responsive to the main firing signal, to cause the flash light emitter to emit a prolonged flash light at the control light intensity for a specified time.

A flash device, which is removably mounted on a camera capable of generating a control flash light intensity for flash photography and a firing signal, comprises a first receiver operable to receive the control flash light intensity; a second receiver operable to receive the firing signal; a controller, which is in responsive to the firing signal, to cause the flash light emitter to emit a prolonged flash light at the control light intensity for a specified time.

A camera system comprises a flash device capable of emitting a prolonged flash light; a distance calculator operable to calculate a distance to an object; a light intensity calculator operable to calculate an intensity of a prolonged flash light for flash photography based on the calculated distance; a focal plane shutter having a front blind and a rear blind; and a controller operable to cause the flash device to emit a prolonged flash light at the calculated intensity from the start of travel of the front blind to the finish of travel of the rear blind.

A camera system comprises a flash device capable of emitting flash light; a focal plane shutter operable to controlledly expose a film, the focal plane shutter including a front blind and a rear blind: a light intensity calculator operable to calculate a control intensity of flash light for the exposure; a flash controller operable to cause the flash device to emit flash light continuously at the control intensity from the start of travel of the front blind to the finish of travel of the rear blind: a maximum light intensity calculator operable to calculate a maximum light intensity available during the exposure; a comparator operable to compare the control light intensity with the maximum light intensity: and a display device operable to display a result of the comparator.

A camera system comprises a camera device including:
a focal plane shutter operable to controlledly expose a film, the focal plane shutter including a front blind and a rear blind; a light intensity calculator operable to calculate a control intensity of flash light for the exposure; a transmitter operable to transmit the calculated control intensity; a flash device including: a receiver operable to receive the calculated control intensity; a maximum light intensity calculator operable to calculate a maximum light intensity available during the exposure; a comparator operable to compare the control light intensity with the maximum light intensity; and a display device operable to display a result of the comparator.

A flash device, which is removably mountable on a camera having a focal plane shutter, comprises a receiver operable to receive a control light intensity for exposure: a maximum light intensity calculator operable to calculate a maximum light intensity available during the exposure; a comparator operable to compare the control light intensity with the maximum light intensity; and a display device operable to display a result of the comparator.

A camera system comprises a flash device capable of emitting flash light; a flash controller operable to control the flash device, the flash controller having a first mode for causing the flash device to emit an instantaneous flash light and a second mode for causing the flash device to emit a prolonged flash light; a discriminator operable to discriminate whether a proper flash light will be emitted for flash photography; and a display device operable to display a result of the discriminator.

A camera system comprises a flash device capable of emitting a prolonged flash light; a discriminator operable to discriminate whether a proper flash light will be emitted for flash photography; and a display device operable to display a result of the discriminator.

A camera, for use with a flash device capable of emitting a prolonged flash light, comprises a light intensity calculator operable to calculate a control light intensity for the flash device; a receiver operable to receive a light intensity available by the flash device; a light intensity comparator operable to compare the control light intensity with the available light intensity; and a controller, which is responsive to the light intensity comparator, to execute a specified operation in accordance with a result of the light intensity comparator.

A camera system comprises a first flash device operable to emit an instantaneous flash light; a second flash device operable to emit a prolonged flash light, the second flash device having a limit light intensity available for the prolonged flash light emission: a calculator operable to calculate a control light intensity for the prolonged flash light emission: a comparator operable to compare the control light intensity with the limit light intensity; and a selector operable to select the first or second flash device in accordance with a result of the comparator.

A camera, for use with a flash device capable of emitting a prolonged flash light, comprises a light measurement device operable to measure a brightness of an object: an aperture value determinator operable to determine an aperture value based on the measured brightness; a prolonged flash light data generator operable to generate a prolonged flash light data of the flash device; a discriminator operable to discriminate whether the determined aperture value and the generated prolonged flash light data will give a proper exposure light; and a controller, which is responsive to the discriminator, to, if the determined aperture value and the generated prolonged flash light data will not give a proper exposure light, cause the aperture determinator to determine a decreased aperture value and cause the discriminator discriminate whether the newly to determined aperture value and the prolonged flash light data will give a proper exposure light.

A camera, for use with a flash device capable of emitting a prolonged flash light, comprises a light measurement device operable to measure a brightness of an object: a shutter speed determinator operable to determine a shutter speed based on the measured brightness; a prolonged flash light data generator operable to generate a prolonged flash light data of the flash device; a discriminator operable to discriminate whether the determined shutter speed and the generated prolonged flash light data will give a proper exposure light: and a controller, which is responsive to the discriminator, to, if the determined shutter speed and the generated prolonged flash light data will not give a proper exposure light, cause the shutter speed determinator to determine a decreased shutter speed and cause the discriminator to discriminate whether the newly determined shutter speed and the prolonged flash light data will give a proper exposure light.

A camera system comprises a camera device having a shutter; a flash device capable of emitting an instantaneous flash light and a prolonged flash light; a first photography controller operable to photograph an object under an ambient light; a second photography controller operable to photograph an object under an instantaneous flash light; a third photography controller operable to photograph an object under a prolonged flash light; and a selector operable to select one of the three photography controller based on a brightness of the object.

A camera, for use with a flash device capable of emitting a prolonged flash light, comprises a shutter; a control shutter speed determinator operable to determine a control shutter speed to drive the shutter; a shake prevention limit shutter speed determinator operable to determine a shake prevention limit shutter speed to prevent a shake of the camera from producing a blurred photographed image; a synchronism limit shutter speed determinator operable to determine a synchronism limit shutter speed to be in synchronism with flash light emission of the flash device; a comparator operable to compare the control shutter speed with the shake prevention limit shutter speed; and a controller, which is responsive to the comparator, to control the flash device based on a result of the comparator.

A camera, for use with a flash device capable of emitting an instantaneous flash light and a prolonged flash light, comprises a shutter; a shake prevention limit shutter speed determinator operable to determine a shake prevention limit shutter speed to prevent a shake of the camera from producing a blurred photographed image; a synchronism limit shutter speed determinator operable to determine a synchronized limit shutter speed to be synchronized with flash light emission of the flash device; a first comparator, operable to compare the synchronism limit shutter speed with the shake prevention limit shutter speed; and a controller in responsive to the first comparator, to control the flash device based on a result of the comparator.

A camera system comprises a camera device operable to photograph an object, the camera device having two selective modes of: a first mode where a control aperture value and a control shutter speed are automatically determined; and a second mode where the operator is allowed to determine either a control aperture value or a control shutter speed; a flash device capable of emitting an instantaneous flash light and a prolonged flash light; a first selecting device operable to select either the instantaneous flash light emission or the prolonged flash light emission based on a first reference when the first mode is selected; and a second selecting device operable to select either the instantaneous flash light emission or the prolonged flash light emission based on a second reference, different from the first reference, when the second mode is selected.

With thus constructed devices, a prolonged flash light is emitted at a light intensity which has been calculated based on a result of the test firing. Also, the calculated light intensity is transmitted from the camera device to the flash device. Further, a light intensity is calculated based on a distance to an object.

A light intensity of prolonged flash light is calculated and a light adjustment is displayed based on the calculated light intensity. Also, the exposure effect of flash light is displayed. The flash light emission is controlled based on an available light intensity. The prolonged flash light emission and the instantaneous flash light emission are changed over in consideration of the available intensity of prolonged flash light and necessary light intensity for exposure.

The shutter speed and aperture value are changed so as to enable the prolonged flash light emission. Also, the non-flash photography, instantaneous flash light photography, and prolonged flash light photography are automatically changed over. Also, the instantaneous flash light photography and the prolonged flash light photography are changed over based on whether the camera device is set in a program mode, an aperture priority mode, an shutter priority mode, or a manual mode. Further, the prolonged flash light emission is controlled based on a shake prevention limit shutter speed.

These and other objects, features and advantages of the present invention will become more apparent upon a reading of the following detailed description and accompanying drawings.

BRIEF DESCRIPTION OF THE DRAWINGS

FIG. 5 is a circuit diagram showing a flash firing circuit;

FIG. 8 is a table showing communication data for each mode of a high speed synchronized flash photography;

DETAILED DESCRIPTION OF THE PREFERRED EMBODIMENTS OF THE INVENTION

A camera system embodying the invention will be described with reference to the accompanying drawings.

Figure 1:
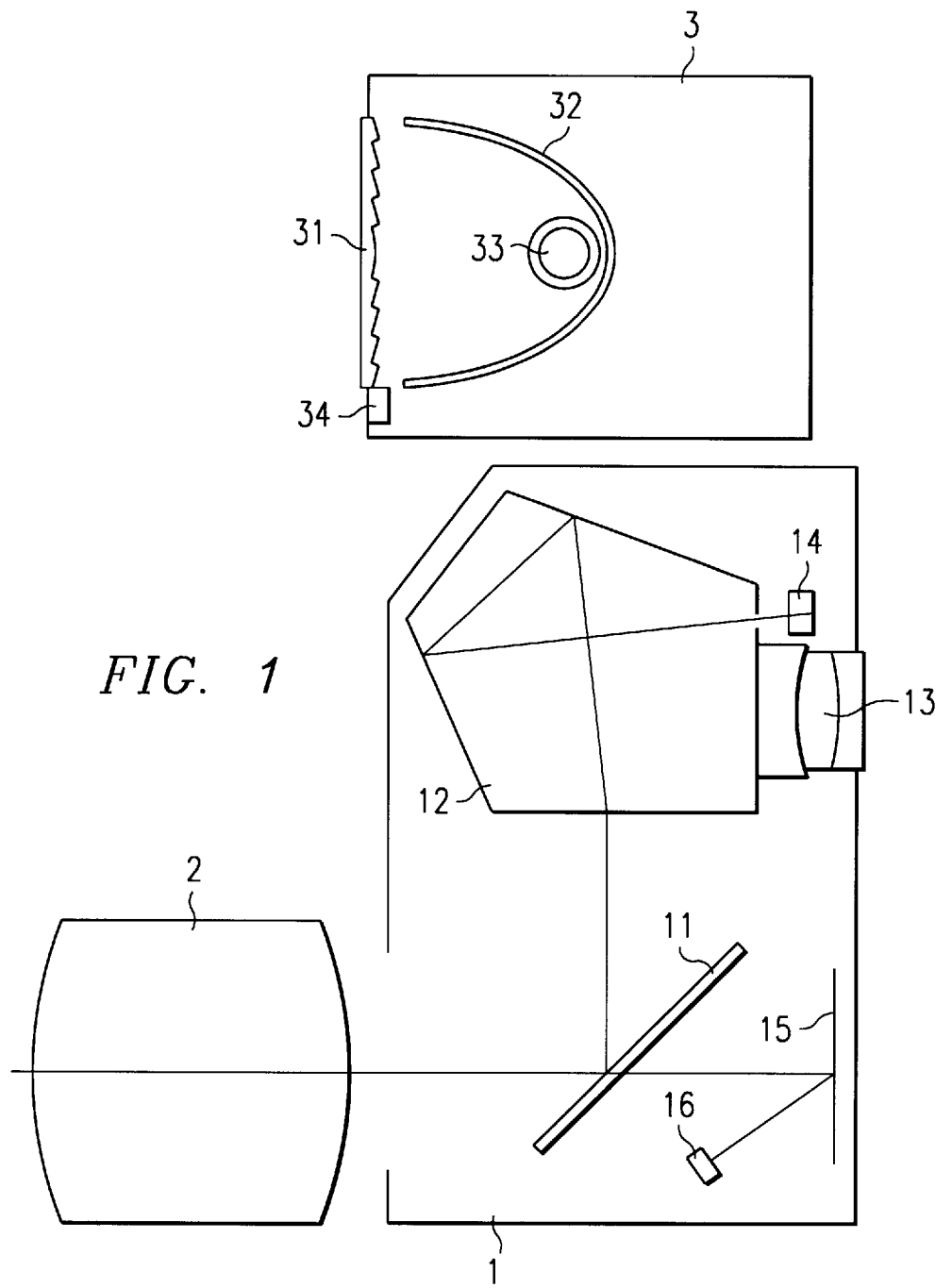
FIG. 1 is a diagram schematically showing an overall construction of a camera system according to the present invention.

FIG. 1 shows an overall construction of the camera system. The camera system comprises a camera device 1, a taking lens 2, and a flash device 3. The camera device 1 is in the form of a single lens reflex camera. The camera device 1 has a reflecting mirror 11, a pentagonal prism 12, a viewfinder 13, a first photosensor 14 above the viewfinder 13, a focal plane shutter 15 immediately before the focal plane, and a second photosensor 16 before the focal plane.

The first photosensor 14 receives light which has Passed the taking lens 2 and the pentagonal prism 12, and is adapted for measuring the brightness in a plurality of sections of a field to calculate both the brightness of a main object and that of a background, and discriminate whether or not the object is against the light. The second photosensor 16 receives light which has passed the taking lens 2 and the reflecting mirror 11 and has been reflected by the film, and is adapted for measuring a film exposure amount.

The flash device 3 is detachably mounted on the camera device 1 and includes a diffusing plate 31, a reflector 32, a flash light discharge tube 33, and a third photosensor 34. The third photosensor 34 receives emitted flash light to detect the intensity of flash light.

This camera system is capable of performing four kinds of exposure modes, that is, a program mode (P-mode), a shutter speed priority mode (S-mode), an aperture priority mode (A-mode), and a manual mode (M-mode). A description of these exposure modes will be omitted because these exposure modes have been well-known.

Also, this camera system, which is provided with the flash device 3, is capable of performing a non-flash photography, a normal flash photography or instantaneous flash light photography, and a high speed synchronized photography or prolonged flash light photography. In the normal flash photography, the gap defined by front and rear blinds of a focal plane shutter is fully opened during flash firing; In other words, the gap travels across a film plane at a shutter speed smaller than a flash synchronized shutter speed. In the high speed synchronized photography, the gap defined by front and rear blinds of a focal plane shutter travels across a film plane at a shutter speed greater than a flash synchronized shutter speed.

The flash device 3 is operable to emit instantaneous flash light, and prolonged flash light. The prolonged flash light includes flat flash light and pulse flat light. The instantaneous flash light is adapted for the normal flash photography. The flat flash light and the pulse flash light are adapted for the high speed synchronized Photography.

In the flat flash light emission, a light having a substantially constant intensity is emitted from the start to the end of the flash firing. In the pulse flash light emission, a light having a high frequency and a triangular waveform is emitted continuously from the start to the end of the flash firing.

In the high speed synchronized flash photography, an intensity of light to be emitted, an amount of light to be emitted, or an amount of light introduced to the film plane is calculated based on an exposure calculation result, a distance to an object, and the like, and the flash light emission is carried out in accordance with the calculated value. It will be noted that the light amount denotes an value obtained by integrating the light intensity during a light emission time.

The high speed synchronized flash photography has four modes.

In the first mode, specifically, the flat flash light emission is carried out. A test light emission is carried out before a main firing to calculate a distance to an object (object distance) DV. Thereafter, a light intensity is calculated based on the calculated object distance DV, the shutter speed, the aperture value, and the brightness BVf of the object illuminated by the flash light. Hereafter, the brightness BVf (=BVt+αEVn) is referred to as a flash control brightness. BVt and αEVn will be described in more detail later.

The calculated light intensity is transmitted to the flash device 3 and is set as a reference value for flash light control. The emitted flash light is detected by the photosensor 34. The flash light emission is controlled by sending to an IGBT, provided in the flash firing circuit, a signal for stopping the flash light emission when the light intensity reaches the reference value and starting the flash light emission when the light intensity is below the reference value.

In the second mode, the pulse flash light emission is performed. The test light emission is carried out before the main firing to calculate the object distance DV. An amount of light per pulse (pulse light amount) for a main firing is calculated based on the calculated object distance DV, aperture value, shutter speed, film sensitivity, firing frequency, and an exposure correction amount for correcting the exposure amount of the main object during the flash firing.

The calculated pulse light amount is transmitted from the camera device 1 to the flash device 3 and set as a reference value for flash light control, similar to the first mode. The emitted flash light is detected by the photosensor 34. The flash light emission is controlled by sending to the IGBT provided in the flash firing circuit a signal for stopping the light emission when the light amount reaches the reference value and starting the light emission a specified number of times in accordance with the firing frequency when the light amount is below the reference value.

In the third mode, the pulse flash light emission is performed. A light adjustment level (SV–DA) corresponding to the pulse light amount in the second mode is calculated based on the exposure correction amount, film sensitivity, shutter speed and firing frequency. The calculated light adjustment level is set as a reference value. A film exposure amount is detected by the photosensor 16. Based on the detected film exposure amount, the flash light emission is controlled.

In the fourth mode, the pulse firing is performed. The object distance DV is calculated based on a defocus amount outputted from the focus detecting circuit 51. A pulse light amount is calculated based on the calculated object distance DV, aperture value, shutter speed, film sensitivity, firing frequency and the exposure correction amount. The calculated pulse light amount is transmitted from the camera to the flash device 3 and set as a reference value for flash light control. Based on the detection of the photosensor 34, the flash light emission is controlled by sending to the IGBT, provided in the flash firing circuit, the signal for stopping the light emission when the light amount reaches the reference light amount and starting and stopping the light emission a specified number of times in accordance with the firing frequency.

The sequence of the principal operations of each mode is as follows:

In the first mode where the flat flash light is emitted:
   Test firing→Calculation of light intensity→Transmission of calculated light intensity to the flash device 3→Set of reference light intensity→Start of light emission (light emission is monitored in the flash device 3);
In the second mode where the pulse flash light is emitted:
   Test firing→Calculation of light amount→Transmission of calculated light amount to the flash device 3→Set of reference light amount→Start of light emission (light emission is monitored in the flash device 3);
In the third mode where the pulse flash light is emitted:
   Calculation of light adjustment level→Start of light emission→Stop of light emission (light emission is monitored in the camera device 1): and
In the fourth mode where the pulse flash light is emitted:
   Autofocussing→Calculation of object distance→Calculation of light amount→Set of reference light amount→Start of light emission (light emission is monitored in the flash device 3)

Figure 2:
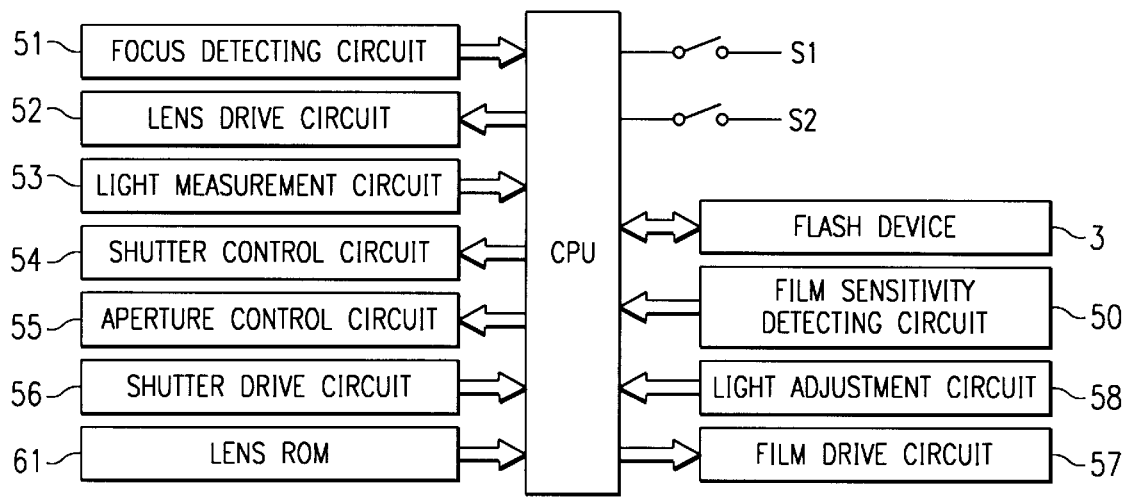
FIG. 2 is a block diagram showing a control system of the camera system.

FIG. 2 shows a control system of the camera system. Indicated at 51 is a focus detecting circuit for detecting a focusing condition. Indicated at 52 is a lens drive circuit for driving the taking lens 2 to attain an in-focus condition based on the detected focusing condition. Indicated at 53 is a light measurement circuit for calculating a brightness of an object. The photosensor 14 is a part of the light measurement circuit 53. Indicated at 54 is a shutter control circuit for calculating a shutter speed based on the light measurement value obtained by the circuit 53 for and controlling the shutter 15 in accordance with the calculated shutter speed. Indicated at 55 is an aperture control circuit for calculating an aperture value based on the light measurement value obtained by the circuit 53 for and controlling a diaphragm in accordance with the calculated aperture value. Indicated at 56 is a shutter drive circuit for driving the shutter and the diaphragm. Indicated at 57 is a film drive circuit. Indicated at 58 is a light adjustment circuit provided for detecting an exposed amount of the film during the flash firing. Indicated at 50 is a film sensitivity detecting circuit for detecting and setting a sensitivity of the film. Indicated at 61 is a lens ROM for storing data concerning the taking lens 2 such as a focal length (FV), an open aperture value (AVO), and a maximum aperture value (AVmax). Indicated at S1 is a light measurement start switch. Indicated at S2 is a release switch.

Figures 3A, 3B:
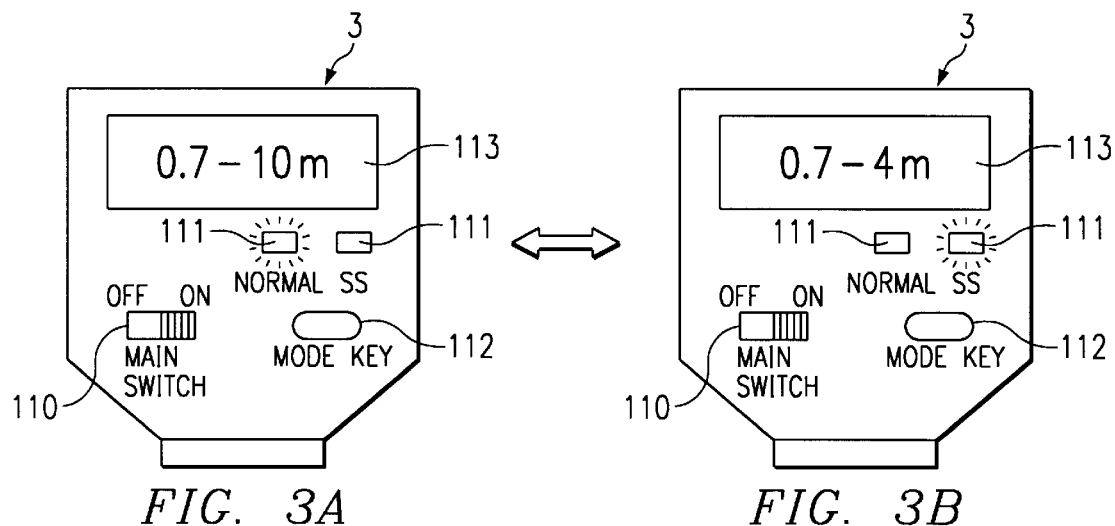
FIGS. 3A and 3B are rear views of a flash device provided in the camera system, showing different states of operation keys of the flash device.

FIGS. 3A and 3B are rear side views of the flash device 3 showing a display unit and an operation unit of the flash device 3. Indicated at 110 is a main switch which is operated to apply power to the flash device 3. Indicated at 111 are indicators for indicating the presently set flash photography mode, i.e., which photography mode is set, the normal flash photography mode or the high speed synchronized flash photography mode. Indicated at 112 is a mode key which is manually operated by the operator to change the photography mode. Indicated at 113 is a display for displaying maximum and minimum flash light coverage distances. FIG. 3A shows an example of display during the normal flash photography mode, whereas FIG. 3B shows an example of display during the high speed synchronized photography mode.

Figure 4:
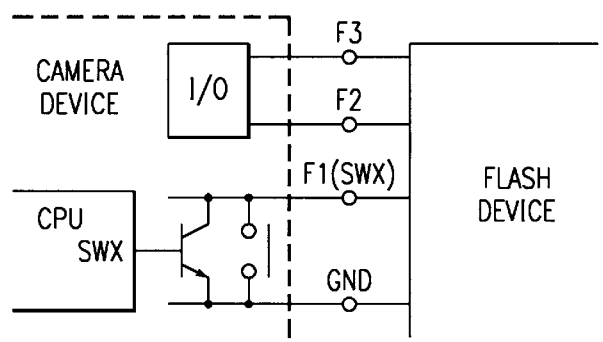
FIG. 4 is a diagram showing connection between the camera device and the flash device.

The connection between the camera device 1 and the flash device 3 will be described next with reference to FIG. 4. Data and control signals such as flash firing start and stop signals are transmitted between the camera device 1 and the flash device 3. Through a contact F1 is outputted a flash firing start signal from the camera device 1 to the flash device 3. Through a contact F2 are transferred photographic data between the camera device 1 and the flash device 3. In the high speed synchronized photography, for example, data (SO) is transmitted from the flash device 3 to the camera device 1 and data (SI) from the camera device 1 to the flash device 3.

The data (SO, SI) transferred during the serial communication through the contact F2 are shown as follows.

The data (SO) includes:
   SSEN: Signal representing that the flash device 3 is capable of executing the high speed synchronized photography;
   IV: Signal representing a guide number of the flash device 3;
   IVmin: Signal representing a minimum guide number of the flash device 3;
   IVmax: Signal representing a maximum guide number of the flash device 3:
   LVtest: Signal representing an intensity of flash light for test firing;
   LVt: Signal representing an intensity of flash light t-seconds after test firing;
   LVmax: Signal representing a maximum intensity of flash light realizable by the flash device 3; and
   LVmin: Signal representing a minimum intensity of flash light realizable by the flash device 3.

The data (SI) includes:
   DV: Signal representing the distance to the object;
   TV: Signal representing the shutter speed;
   FV: Signal representing the focal length;
   SV: Signal representing the film sensitivity;
   AV: Signal representing the aperture value;
   NOTFIRE: Signal representing whether or not the flash device 3 is to be fired;

FLATREQ: Signal representing the camera device 1 requesting the high speed synchronized photography;

FLATTIME: Signal representing a time during which the high speed synchronized photography is executed;

LVC: Signal representing the intensity of flash light during a main firing; and

IVC: Signal representing the amount of flash light during a main firing.

Through a contact F3 is transmitted from the camera device 1 to the flash device 3 a timing signal for the data transferred through the contact F2 from the camera device 1 to the flash device 3. The signals transmitted through the contacts F2 and F3 are inputted to and outputted from the camera device 1 through an input-output interface. The data communication between the camera device 1 and the flash device 3 is conducted using the above contacts.

The time FLATTIME will be calculated in accordance with the following equation:

FLATTIME=shutter speed+blind speed+$\alpha$.

The blind speed is a speed at which the front and rear blinds of the focal plane shutter travel across the film plane. $\alpha$ is added in the above equation in consideration of a control error, so that the flash firing control is executed longer than a time required to actually execute the high speed synchronized photography.

Figure 6:
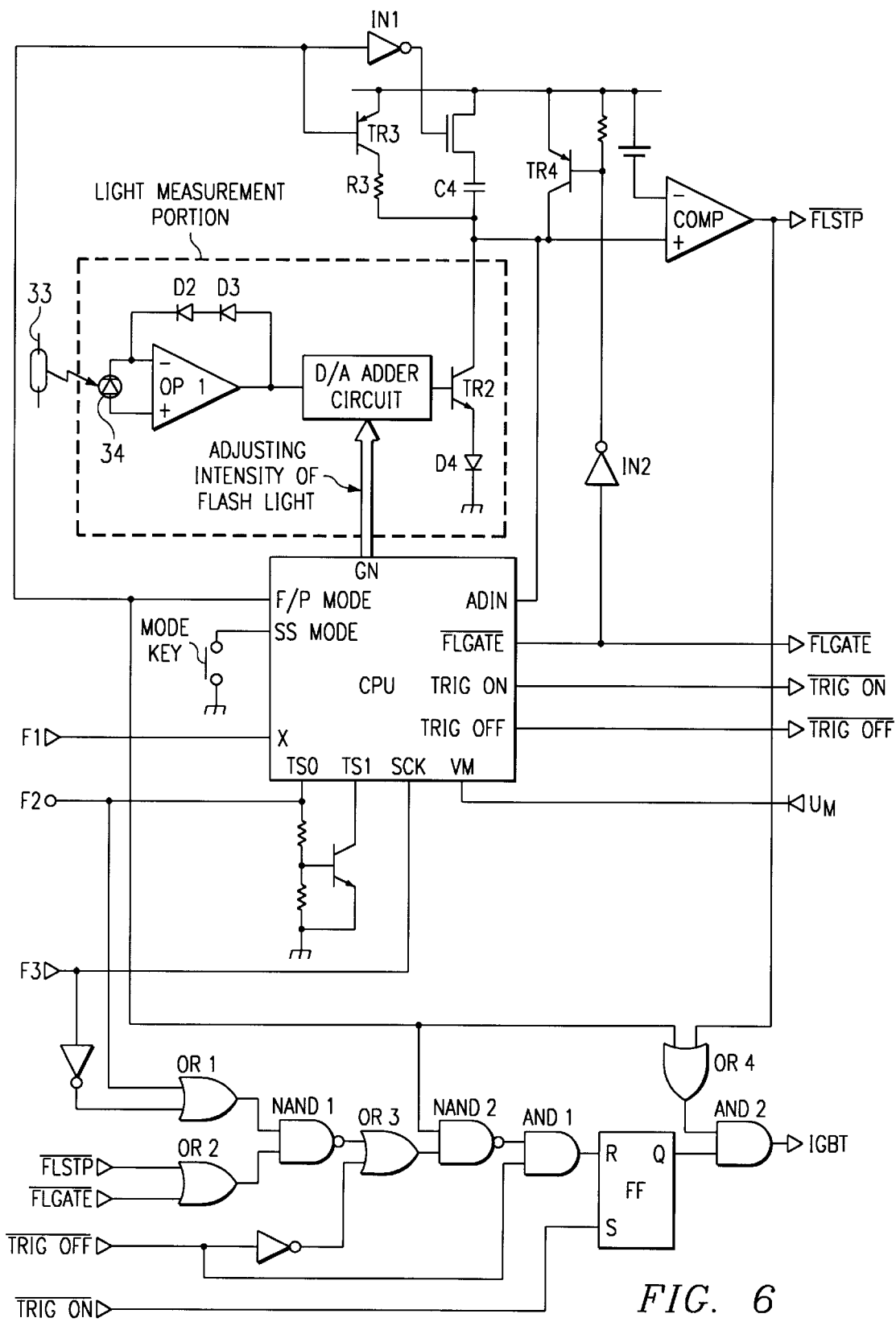
FIG. 6 is a circuit diagram showing a flash control circuit.

The flash device 3 has a flash firing circuit and flash control circuit as shown in FIGS. 5 and 6. These circuits carry out the normal flash photography as well as the high speed synchronized flash photography.

FIG. 5 shows a construction of the flash firing circuit. In this figure, indicated at SW1, SW2 are main switches of the flash device which are turned on and off to activate and inactivate the flash device. When the switch SW1 is turned on, a voltage of about 6 V is applied to a DC-to-DC converter 312. The switch SW2 is turned on and off according to the state of the switch SW1. Indicated at 312 is the DC-to-DC converter for boosting a voltage for charging a main capacitor C1. The flash light discharge tube 33 is supplied with electric charges from the main capacitor C1 and emits flash light. An IGBT, for permitting and prohibiting the light emission, is provided in this discharge path.

A collector terminal of a transistor TRI is connected with a base terminal of the IGBT. An IGBT control signal from the flash control circuit is inputted to a base terminal of the transistor TR1. When the transistor TR1 is turned off, a voltage of 12 V is applied to the base terminal of the IGBT, thereby turning on the IGBT. On the contrary, when the transistor TR1 is turned on, the IGBT is turned off. A capacitor C2, a transformer T and the IGBT constitute a trigger circuit. The capacitor C2 is charged at the same potential as the main capacitor C1 to excite the flash light discharge tube 33. When the IGBT is turned on, the charges stored in the capacitor C2 are discharged through the transformer TR. Upon receipt of the voltage boosted by the transformer TR, the discharge tube 33 starts emitting flash light. A capacitor C3 is provided to apply a voltage twice as high to the discharge tube 33 so as to facilitate the light emission.

A terminal VM is disposed at a position extended from an intermediate position between resistors R1 and R2 connected in parallel with the main capacitor C1 to monitor a voltage charged in the main capacitor C1.

The flash firing circuit operates as follows. When the main switch SW1 of the flash device 3 is turned on, the switch SW2 is turned on accordingly. A supply voltage of 6 V is supplied to the main capacitor C1 through a diode D1 after being boosted by the DC-to-DC converter 312, so that a voltage of 300 V is charged in the capacitor C1.

At this time, a voltage of 300 V is charged in the capacitor C2 constituting in part the trigger circuit as well as in the capacitor C3 for applying a voltage twice as high to the discharge tube 33. Thereafter, the transistor R1 is turned off when the IGBT control signal of "low" level is inputted to the base terminal thereof, and a voltage of 12 V is supplied to the IGBT.

Upon receipt of this voltage, the IGBT is turned on. At the same time, the trigger circuit operates, thereby causing the discharge tube 33 to emit flash light. When the IGBT control signal of "high" level is inputted to the base terminal of the transistor TR1 during the light emission, the IGBT is turned off, thereby interrupting the light emission. When the IGBT control signal of "low" level is inputted to the base terminal of the transistor TR1 again, the light emission is started again. The flash firing can be carried out with a substantially constant light intensity by repeating the above with a high frequency, i.e., by continuously changing the input to the transistor TR1 between "low" level and "high" level.

FIG. 6 shows a construction of the flash control circuit. The third photosensor 34, disposed at the bottom of the flash panel 32, receives the light emitted from the discharge tube 33. The third photosensor 34 is adapted to detect the intensity of flash light and output a current according to this intensity.

This current is applied to an operational amplifier OP1. An output current from the operational amplifier OP1 is converted into a voltage logarithmically compressed by diodes D2 and D3. A D/A adder circuit is adapted to boost an output voltage of the operational amplifier OP1 with a view to adjusting the intensity of flash light.

A transistor TR2 and a diode D4 are adapted to convert the logarithmically compressed output voltage from the operational amplifier OP1 into a logarithmically expanded current. A transistor TR3 and a field-effect transistor act as a switch for controlling the power application to a resistor R3 and a capacitor C4 by being turned on and off in accordance with a signal from a terminal F/PMODE to be described later.

A comparator COMP compares a potential input to its non-inversion input terminal when a current flows through the resistor R3 and a constant potential connected with its inversion input terminal.

In the first mode of the high speed synchronized flash photography, the current is caused to flow not through the capacitor C4, but through the resistor R3 because the flash firing control is executed with a substantially constant light intensity in the first mode. In other words, the current which flows through the resistor R3 (corresponding to the output from the photosensor) corresponds to the light intensity, and the control is executed in accordance with the comparison result of the comparator COMP.

Specifically, when the current flowing through the resistor R3 falls below a given value (a given light intensity), the comparator COMP outputs the IGBT control signal of "high" level to start the firing of the flash device 3. When this current rises above the given value, the comparator COMP outputs the IGBT control signal of "low" level to stop the firing of the flash device. Since these operations are repeated at a high speed, the IGBT is turned on and off with a high frequency, with the result that the flash firing control can be executed with a substantially constant light intensity.

On the other hand, the current is caused to flow through the capacitor C4 in the normal flash photography and in the second to fourth modes of the high speed synchronized flash photography, because the flash firing control is executed based on the light amount. Specifically, electric charges stored in the capacitor C4 (corresponding to the output of the photosensor) corresponds to the light amount, and the following control is executed by comparing a potential different in the capacitor C4 and a reference voltage by means of the comparator COMP.

When the electric charges stored in the capacitor C4 become in excess of a given value after the start of the flash firing, the comparator COMP inverts its output and outputs the IGBT control signal of "low" level, thereby stopping the firing of the flash device 3. By repeating these operations at a high speed, the pulse firing can be realized during which flash light is emitted continuously.

A transistor TR4 to which a signal from a gate terminal FLGATE is inputted during the normal flash photography acts as a switch for causing the electric charges stored in the capacitor C4 to be discharged.

A CPU of the flash control circuit is provided with terminals as shown in FIG. 6. Indicated at F/PMODE is an outputted terminal through which a signal is output to switch the flash light between the flat flash light and the pulse light.

A signal of "low" level is outputted from the E/PMODE terminal in the case of the flat flash light emission in the first mode, whereas a signal of "high" level is outputted in the case of the pulse flash light emission in the first mode.

Indicated at SSmode is an inputted terminal through witch a signal is inputted to switch the flash light between the flat flash light and the pulse flash light. Indicated at GN is an output terminal through which a signal is outputted to the D/A adder circuit.

Indicated at FLGATE is a gate terminal through which a signal for enabling and prohibiting the integration of the electric charges stored in the capacitor C4 is outputted and the flash firing stop signal from an FLSTP terminal is inputted.

Indicated at TRIGON and TRIGOFF are terminals through which a signal for starting the pulse flash light emission and a signal for forcibly stopping the pulse flash light emission are outputted, respectively.

The terminal VM is the one described with reference to FIG. 5, and a signal representing a voltage corresponding to the electric charges stored in the main capacitor C1 is inputted through this terminal so that CPU can detect this voltage.

Indicated at X is a terminal through which a timing signal for starting a series of light emissions for the flat or pulse flash light emission is inputted. The level of this timing signal is inverted from "high" to "low" immediately before the blinds of the shutter start traveling.

Indicated at TSI and TSO are terminals through which signals representing the data SI and the data SO are inputted and outputted, respectively. Indicated at SCK is a terminal through which a clock transmitted from the camera is inputted.

Next, a construction of logic circuits provided in the flash control circuit are schematically described, taking as an example the flash firing operation during the execution of the first mode of the high speed synchronized flash photograph.

In the first mode, since a "low" level output from the terminal F/PMODE is fed to a NAND2, the NAND2 always feeds a "high" level output to an AND1 regardless of an output from an OR3. In other words, the NAND2 is constructed such that signals from the contacts F2 and F3 and the terminals FLSTP and FLGATE have no Influence on the AND2.

Therefore, the NAND2 always feeds the "high" level output to the AND1 and the same output as the one from the terminal TRIGOFF is fed from the AND1 to a reset terminal of a flip-flop.

To a set terminal of the flip-flop is inputted an output from the terminal TRIGON. Accordingly, the flip-flop is controlled only by the flash firing start and stop signals from the CPU. On the other hand, since the "low" level output from the terminal F/PMODE is also fed to an OR4, an output of the comparator COMP is fed to the AND2 as it is. In other words, the OR4 is constructed such that the output of the comparator COMP is fed to the AND2 as it is. Since the "high" level signal is fed from the flip-flop to the AND2 during the flash firing (i.e., a period until the flash firing stop signal is outputted after the flash firing start signal is outputted), the IGBT control signal corresponds to the output of the comparator COMP during this period. Thus, a high frequency pulse train output from the comparator COMP is inputted to the transistor TR1 shown in FIG. 15 as an IGBT control signal.

The operation of the flash control circuit is described. In the case of the first mode, a "low" level output is fed from the terminal F/PMODE to the OR4. Since the output of the comparator COMP and the output of the flip-flop are "high" before the flash firing, the level of the IGBT control signal is "high".

The output of the flip-flop during the flash firing is always "high", and is inputted to the AND2. Accordingly, the level of the IGBT control signal is "high" when the output of the comparator COMP is "high", while being "low" when the output of the comparator COMP is "low". The flash firing is carried with a substantially constant light intensity by repeating the above with a high frequency, i.e., by continuously changing the level of the input to the base terminal of the transistor TR1.

When the flash firing is stopped (a time TO after the start of the flash firing), the output of the NAND2 is always "high" since the output of the terminal F/PMODE is "low". Since the output of the NAND2 is inputted to the AND1, the flip flop is reset upon receipt of the "low" level input from the terminal TRIGOFF. As a result, the output of the flip-flop becomes "low" and a "low" level output is always fed to the IGBT, thereby stopping the flash firing.

In synchronism therewith, the output of the terminal FLGATE becomes "high", turning on the transistor TR4. Consequently, the comparator COMP stops operating. As seen from the above description, the flash control circuit is provided to control the level of the IGBT control signal in accordance with the data (SO, SI) from the camera device 1 to thereby control the intensity of the flash light.

Figure 7:
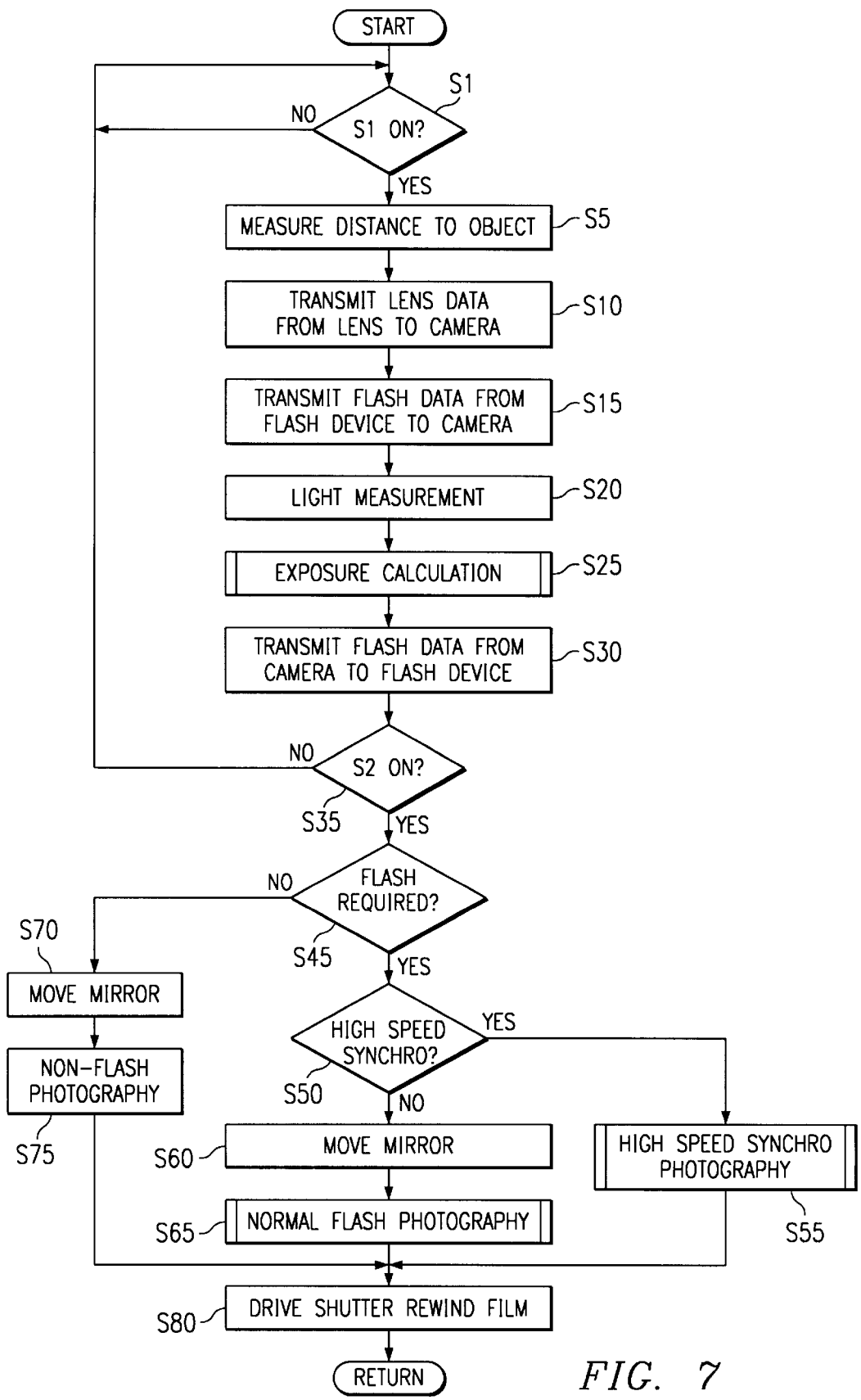
FIG. 7 is a flowchart showing a main operation routine of the camera system.

Next, operations of this camera system will be described with reference to flowcharts. FIG. 7 shows a main routine of a photographing operation of the camera system. It should be noted that before entering this main routine, the operator selectively sets one of the P-mode, S-mode, A-mode, and M-mode, and further one of the first to fourth modes of the high speed synchronized flash photography if necessary.

When the camera system is powered to enable an operation, this routine is started. In Step S1, it is discriminated whether a light measurement start switch S1 is on. This routine proceeds to Step S5 if the discrimination result is in the affirmative, while repeating Step S1 until the switch S1 is turned on if the discrimination result is in the negative.

A distance to an object is measured in Step S5 and lens data are transmitted from the lens 2 to the camera device 1 in Step S10. The data transmitted in Step S10 include a focal length (FV), an open aperture value (AV0), and a maximum aperture value (AVmax). Flash data are transmitted from the flash device 3 to the camera device 1 in Step S15 and a light measurement is carried out in Step S20.

Subsequently, an exposure calculation is performed in Step S25. In Step S25, it is judged, based on the data transmitted from the lens 2 to the camera device 1 and from the flash device 3 to the camera device 1 and the exposure calculation result, which photography is most suitable out of the high speed synchronized photography, normal flash photography, and non-flash photography.

Subsequently, in Step S30, data concerning the exposure calculation values obtained in Step S25 and a suitable photography way (high speed synchronized flash photography, normal flash photography, or non-flash photography) selected based on the exposure calculation values are transmitted from the camera device 1 to the flash device 3.

In Step S35, it is discriminated whether a release switch S2 is on. This routine returns to Step S1 if the discrimination result in Step S35 is in the negative, while proceeding to Step S45 if it is in the affirmative.

In Step S45, it is discriminated whether the flash firing is required. If the discrimination result in Step S45 is in the affirmative, this routine proceeds to Step S50 in which it is discriminated whether the flash photography way selected in Step S25 is the high speed synchronized photography. If the discrimination result in Step S50 is in the affirmative, the high speed synchronized flash photography is executed in Step S55. The high speed synchronized flash photography will be described in detail later with reference to flowcharts shown in FIGS. 25 to 28.

On the other hand, if the discrimination result in Step S50 is in the negative, that is, the normal flash photography has been selected, this routine proceeds to Step S60 in which a mirror is moved to a retracted position and the diaphragm is controlled to attain the set aperture value. Subsequently, in Step S65, the normal flash photography is executed.

If the discrimination result in Step S45 is in the negative, that is, the non-flash photography has been selected, this routine proceeds to Step S70 in which the mirror is moved to the retracted position and the diaphragm is controlled to attain the set aperture value. After Steps S55, S65 and S75, this routine proceeds to Step S80 in which the front and rear blinds are caused to travel and the film is rewound.

The contents of data transmitted during the data communication in Steps S15, S30 and S55 are tabled as shown in FIG. 8.

In Step S15, the data are transmitted from the flash device 3 to the camera device 1. The data transmitted in this step include data IV, data SSEN, data LVtest, data LVmax and data LVmin.

In Step S30, the values obtained as a result of the exposure calculation in Step S25 are transmitted from the camera device 1 to the flash device 3. The data transmitted in this step in the first mode include data DV, data TV, data FV, data SV, data AV, data NOTFIRE, data FLATREQ and data FLATTIME.

In Step S55, data LVC is transmitted from the camera device 1 to the flash device 3. In the first mode, the object distance DV is calculated by carrying out the test firing and the flash light intensity LVC during the main firing is calculated based on the calculated object distance DV. The obtained data LVC is transmitted from the camera device 1 to the flash device 3.

This data transmission is made because the light intensity LV obtained in Step S25 may be unreliable if the focusing condition is detected when the object distance DV is short since the light intensity LV is calculated based on the object distance DV calculated from the defocus amount outputted from the focus detecting circuit 1. Since the calculation of the object distance DV based on the defocus amount is a known technique disclosed in Japanese Unexamined Patent Publication No. 59-123822, it is not described in detail here.

In the first mode, the test firing is carried out to calculate the object distance in the high speed synchronized photography in Step S55 and the intensity of the flash light during the main firing is calculated based on the calculated object distance. However, it may also be possible to carry out the test firing during the exposure calculation in Step S25 to calculate the object distance and to use the light intensity LV calculated from the calculated object distance as the control light intensity LVC during the main firing.

Alternatively, the light intensity calculated in Step S25 may be used as the control light intensity LVC during the main firing.

Next, the "Exposure Calculation" will be described. In this embodiment, there are provided two subroutines of "Exposure Calculation I" and "Exposure Calculation II", and "Exposure Calculation III" for the case of the P-mode being selected, and the case of the S-mode, A-mode, or M-mode being selected, respectively.

The subroutine "Exposure Calculation I" for the P-mode will be first described with reference to FIGS. 9A and 9B. In Steps S100 and S105, to discriminate whether the scene to be photographed is against the light, a brightness difference $\alpha EV$ (=$BVa2-BVs2$) between a background brightness $BVa2$ and a main object brightness $BVs2$ is calculated. The photosensor 14 measures respective brightness of a plurality of sections in a field to provide the background and main object brightness $BVa2$ and $BVs2$.

If $\alpha EV \geq \gamma EV$ (where $\gamma > 0$), it is judged that the scene to be photographed is against the light and a control is executed so that the background image is overexposed and a main object image is underexposed. If $\alpha EV < \gamma EV$, it is determined that the scene to be photographed is not against the light and a control is executed so that the main object image is more exposed than the background image.

In order to execute such a control, the main object brightness $BVs2$ is set lower than a proper level by $\alpha EV$ (a correction amount to make a final print reproduce the scene properly illuminated by the ambient light) and a control aperture value AVc and a control shutter speed TVc are obtained in accordance with a known program line using a reference brightness BVt (BVt=$BVs2+\alpha$) on which the exposure control of the camera is based when the scene to be photographed is not against the light.

In this control, the control aperture value AVc and the control shutter value TVc are values obtained when the exposure control is carried out on the basis of the main object brightness and BVt denotes a brightness for determining an exposure amount of the background since the background is not subject to the flash light.

On the other hand, in order to execute such a control that the background image is overexposed and the main object image is underexposed, the main object brightness BVs2 is set lower than the proper level by $(\Delta EV-\beta)EV$ (a correction amount to make a final picture reproduce the scene against the light) and a control aperture value AVc and a control shutter speed TVc are obtained in accordance with a predetermined program line based on the reference brightness BVt when the scene to be photographed is against the light.

In this control, the control aperture value AVc and the control shutter value TVc are values obtained when the exposure control is carried out on the basis of the background brightness and BVt denotes a brightness for determining an exposure amount of the background since the background is not subject to the flash light.

As described above, in Steps S100 and S105, it is discriminated whether the scene to be photographed is against the light; the reference brightness BVt is calculated according to the aforementioned method corresponding to the discrimination result; and the control aperture value AVc and the control shutter speed TVc are calculated based on the reference brightness BVt.

Subsequently, in Step S110, it is discriminated whether the control shutter speed TVc is greater than the flash synchronized shutter speed TVx. In other words, it is discriminated whether the control shutter speed TVc requires the high speed synchronized photography in Step S110. This subroutine proceeds to Step S115 if the discrimination result in Step S110 is in the affirmative, while proceeding to Step S111 if it is in the negative.

In Step S111, a "Light Amount Calculation in Normal Flash Photography" is executed. The following controls are executed in Steps S115 and S120. The flash control brightness BVf is calculated based on the reference brightness BVt and the exposure correction amount $\Delta EVn$ which contributes to the exposure amount of the main object when the flash device is fired. $\Delta EVn$ is a constant set for each photographing state (against the light, properly illuminated by the ambient light, in the dark, etc.). The light intensity LV (LV=BVf+DV, hereinafter the light intensity LV is referred to as a control light intensity) is calculated based on the brightness BVf and the object distance DV. The object distance DV is obtained from the defocus amount output from the focus detecting circuit 1 as described above.

This subroutine proceeds to Steps S125 to S135 when the control light intensity LV calculated in Step S120 is suitable for the high speed synchronized photography. Specifically, in Step S125, it is discriminated whether the control light intensity LV is higher than the minimum realizable light intensity LVmin. If the discrimination result is in the affirmative, it is further discriminated in Step S130 whether the control light intensity LV is lower than the maximum realizable light intensity LVmax. If the discrimination result in Step S125 is in the negative, this subroutine proceeds to Step 3160.

In Step S160, the control shutter speed TVc is shifted to the flash synchronized shutter speed TVx and a new control aperture value AVc is calculated by adding a shifted amount (TVc−TVx) to the old control aperture value AVc.

In Step S165, it is discriminated whether the new control aperture value AVc is not greater than the maximum aperture value AVmax. If the discrimination result in Step S165 is in the affirmative, the control shutter speed TVc is set to TVx in Step S170 and the "Light Amount Calculation in Normal Flash Photography" is executed in Step S175.

If the discrimination result in Step S165 is in the negative, it is discriminated whether the flash device 3 should be forcibly fired in Step S180. If the discrimination result in Step S180 is in the affirmative, this subroutine returns to Step S135 in which the high speed synchronization flag is set. If the discrimination result in Step S180 is in the negative, this subroutine proceeds to Step S185 in which an ambient light flag is set.

The operations of Steps S160 to S185 are carried out when the high speed synchronized flash photography is impossible, i.e., when the normal flash photography or non-flash photography is suitable.

If the discrimination result in Step S130 is in the affirmative, a high speed synchronization flag is set in Step S135. If the discrimination result in Step S130 is in the negative (the flash photography is not realizable with the control light intensity LV), this subroutine proceeds to Step S140.

In Steps S140 to S150, a new reference brightness BVt which is smaller than the reference brightness BVt calculated in Step S120 is calculated since the flash photography cannot be executed with the control light intensity LV calculated in Step S120. Specifically, in Step S140, it is discriminated whether the reference brightness BVt is greater than the main object brightness BVs2. If the discrimination result in Step S140 is in the affirmative, the reference brightness BVt is recalculated in Step S145.

When the scene to be photographed is not against the light, the reference brightness BVt is calculated:

BVt=BVs2+α−δ.

When the scene to be photographed is against the light, the reference brightness BVt is calculated:

BVt=BVs2+($\Delta EV-\beta$)−δ.

In these equations, δ denotes a predetermined value, e.g., δ=0.5 Ev.

In Step S150, the control aperture value AVc and the control shutter speed TVc are obtained in accordance with the program line based on the recalculated reference brightness BVt. Thereafter, this subroutine returns to Step S110 to start the operations similar to the aforementioned ones.

In this way, the reference brightness BVt is lowered within the range of keeping the main object from being excessively exposed under the ambient light. The control shutter speed TVc and the control aperture value AVc are decreased. Accordingly, the exposure correction amount αEVn will increase in the high speed synchronized flash photography, enabling the main object to be exposed properly.

If the main object brightness BVs2 is greater than the reference brightness BVt (NO in Step S140), this subroutine proceeds to Steps S160' to S185' in which operations identical to those of Steps S160 to S185 are executed.

The subroutine "Light Amount Calculation in Normal Flash Photography" will be described next with reference to FIGS. 10A and 10B.

The operations in Step S200 to S215 are carried out when the flash photography is possible with the light amount calculated in Step S200. Specifically, in Step S200, a total light amount IV (IV=AVc+DV+$\Delta EVn$−SV) emitted during an exposure time is calculated based on the control aperture value AVc, object distance DV, exposure correction amount $\Delta EVn$ and film sensitivity SV. Subsequently, in Step S205, it is discriminated whether the flash synchronization is carried out during the daytime.

If the discrimination result in Step S205 is in the affirmative, this subroutine proceeds to Step S210 in which it is discriminated whether the total light amount IV is smaller than a maximum guide number IVmax for the flash photography. This subroutine proceeds to Step S215 if the discrimination result in Step S205 is in the negative or the discrimination result in Step S210 is in the affirmative.

In Step S215, the high speed synchronization flag is reset. If the discrimination result in Step S210 is in the negative, this subroutine proceeds to Step S225.

The operations in Steps S225 to S245 are carried out when the total light amount is recalculated by changing the control aperture value AVc while leaving the reference brightness BVt as it is. Specifically, in Step S225, it is discriminated whether the control aperture value AVc is at variance with the open aperture value AVo. If the discrimination result in Step S225 is in the affirmative, it is discriminated whether the control shutter speed TVc is at variance with the flash synchronized shutter speed TVx in Step S230.

If the discrimination result in Step S230 is in the affirmative, a shift amount corresponding to the smaller one of (AVc−AVO) and (TVc−TVx) is calculated in Step S235. A new control aperture value AVc is calculated by subtracting the shift amount calculated in Step S235 from the old control value AVc in Step S240 and a new control shutter speed TVc is calculated by adding the shift amount to the old control shutter speed TVc.

If the discrimination result in Step S230 is in the negative, this subroutine proceeds to Step S250. The operations in Step S250 to S270 are carried out to calculate a shift amount for the reference brightness BVt and the main object brightness BVs2 since the shift amount for the control shutter value TVc cannot be calculated as in Step S235 because TVx=TVc. Specifically, in Step S250, it is discriminated whether the reference brightness BVt is greater than the main object brightness BVs2.

If the discrimination result in Step S250 is in the affirmative, a shift amount corresponding to the smaller one of (AVc−AV0) and (BVt−BVs2) is calculated in Step S255. A new reference brightness BVt is calculated by subtracting the shift amount calculated in Step S255 from the old reference brightness BVt in Step S260 and a new control aperture value AVc is calculated by subtracting the shifted amount from the old control aperture value AVc in Step S265.

Subsequently, in Step S270, it is discriminated whether (BVs2−BVt)>−1. If the discrimination result in Step S270 is in the affirmative, this subroutine returns to Step S200 to carry out the processing similar to the one described above.

If the discrimination result is in the negative in Step S225 or S250, this subroutine proceeds to Step S280 in which it is discriminated whether the forcible flash firing is set. The forcible flash firing is set by way of a set button (not shown) by the operator. The high speed synchronization flag is reset in Step 5285 if the discrimination result is in the affirmative, while the ambient light flag is set in Step S295 if it is in the negative.

Figure 11A:
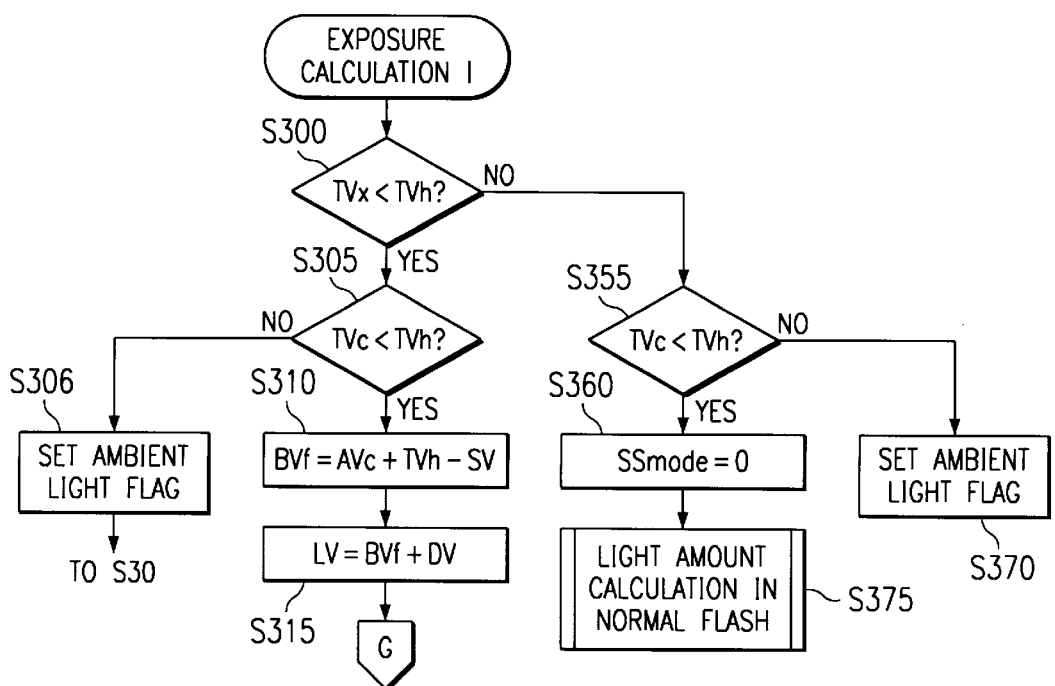
FIGS. 11A and 11B are flowcharts combinedly showing an operation sequence of another subroutine "Exposure Calculation I" of the system main routine.
Figure 11B:
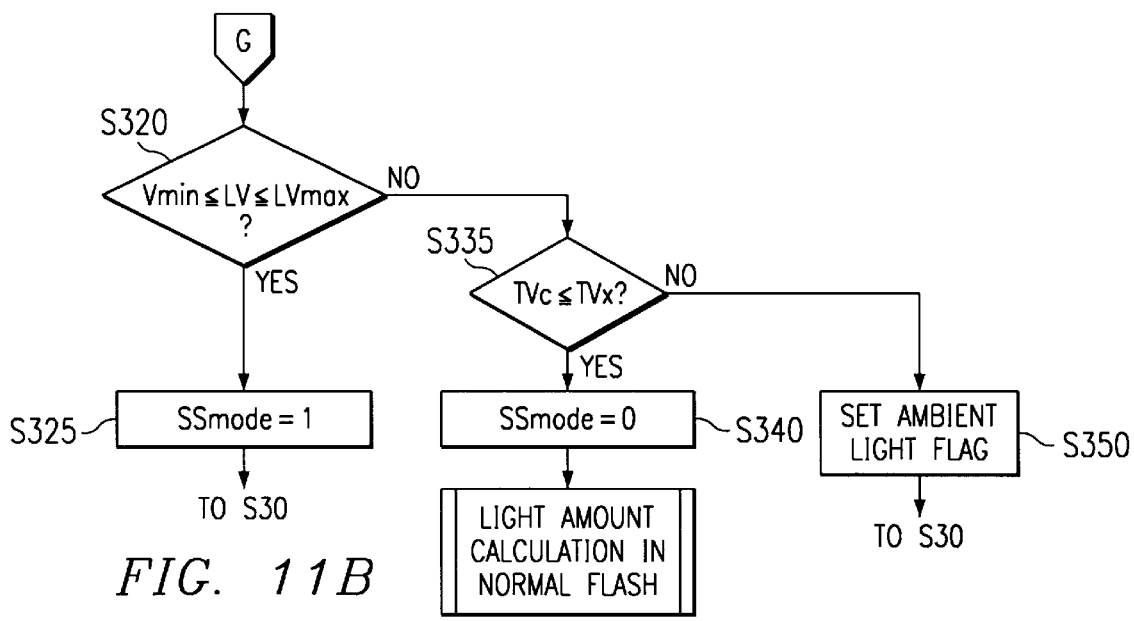

FIGS. 11A and 11B show operations which are executed in the case of the object being in the dark in the P-mode. The judgment of the object being in the dark is executed based on the calculation of a brightness difference ΔEV (=BVa2−BVs2) between a background brightness BVa2 and a main object brightness BVs2. The control aperture value AVc and the control shutter value TVc are determined based on the main object brightness.

The operations in Step S300 to S325 are carried out when a shake prevention shutter speed TVh (1/focal length) is greater than the flash synchronized shutter speed TVx and the control shutter speed TVc is smaller than the shake prevention shutter speed TVh. When TVh>TVc and the control light intensity LV is within a controllable range, the high speed synchronized flash photography is possible and is thus selected despite the possibility of the camera shake. Specifically, in Step S300, it is discriminated whether the shake preventing shutter speed TVh is greater than the flash synchronized shutter speed TVx.

If TVx<TVh (YES in Step S300), it is discriminated whether the shake prevention shutter speed TVh is greater than the control shutter speed TVc in Step S305. If TVx≧TVh (NO in Step S300), this subroutine proceeds to Step S355 to be mentioned later.

If TVc<TVh (YES in Step S305), the flash control brightness BVf (BVf=AVc+TVh−SV) is calculated based on the control aperture value AVc, shake prevention shutter speed TVh and film sensitivity SV in Step S310. If TVc≧TVh (NO in Step S305), the ambient light flag is set upon judgment that the non-flash photography is suitable in Step S306.

In Step S315, the control light intensity LV (LV=BVf+DV) is calculated based on the brightness BVf and the object distance DV. The object distance DV is a value calculated from the defocus amount outputted from the focus detecting circuit 1. Subsequently, in Step S320, it is discriminated whether the control light intensity LV is within the flash photographable range. The high speed synchronization flag is set in Step S325 if the discrimination result in Step S320 is in the affirmative, whereas this subroutine proceeds to Step S335 if it is in the negative.

The operations in Steps S335 to S340 are carried out when the normal flash photography is judged to be suitable because TVc<TVx and the flash light is not, otherwise, reachable to the main object. Specifically, in Step S335, it is discriminated whether the flash synchronized shutter speed TVx is not smaller than the control shutter speed TVc.

Figure 10A:
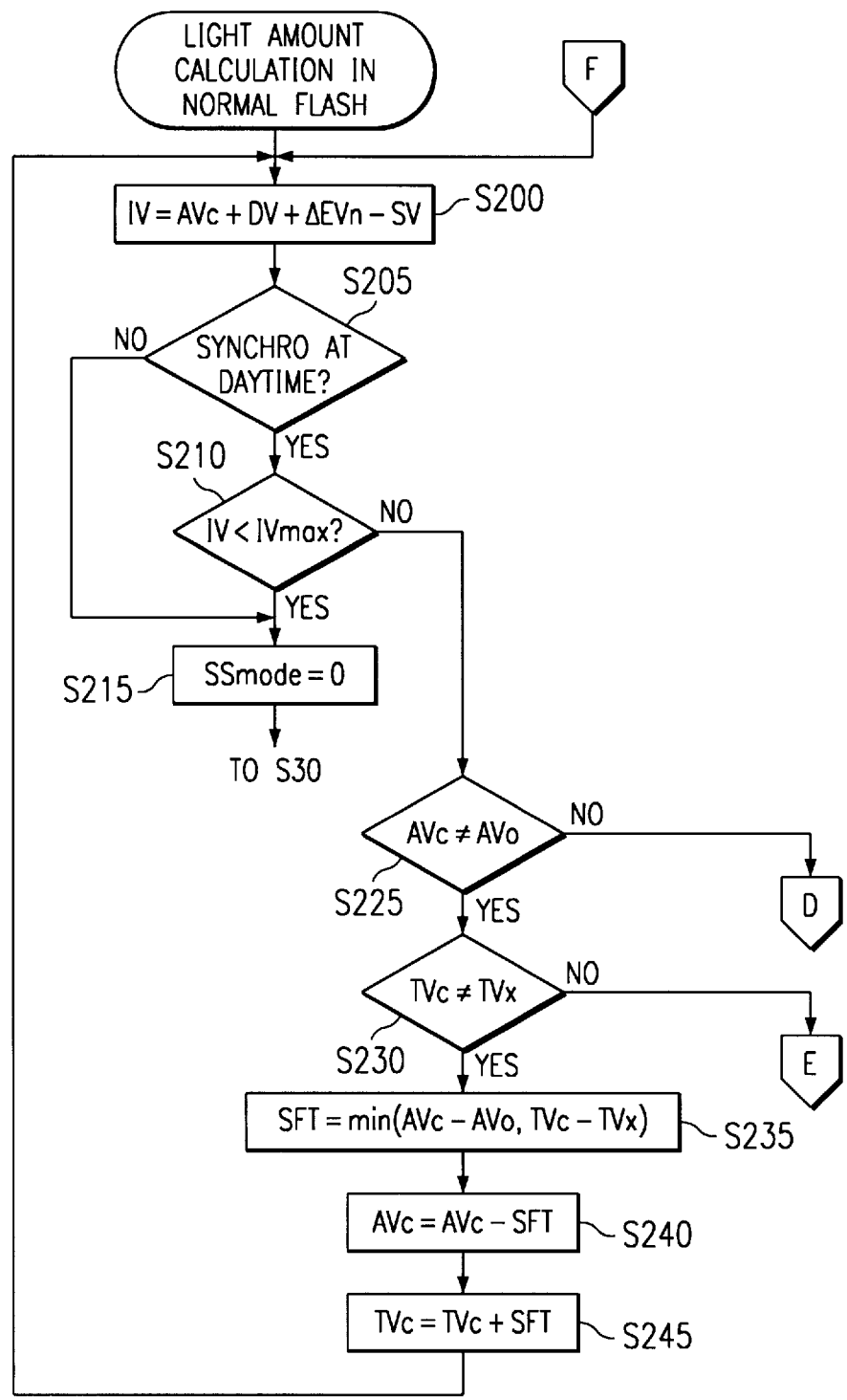
FIGS. 10A and 10B are flowcharts combinedly showing an operation sequence of a subroutine "Light Amount Calculation in Normal Flash Photography" of the system main routine.
Figure 10B:
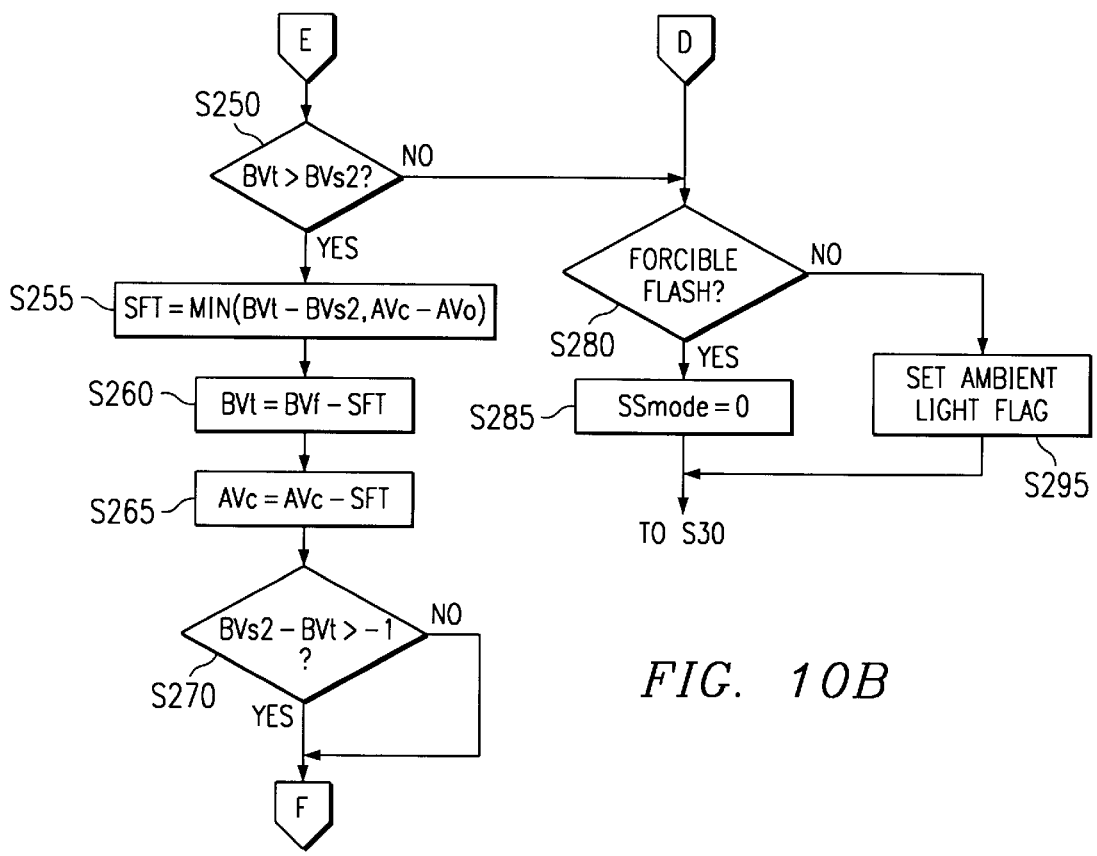

If TVc≦TVx (YES in Step S335), the high speed synchronization flag is reset in Step s340, the control shutter speed TVc is set to TVx in Step S342 and then a control similar to the one in the subroutine "Light Amount Calculation in Normal Flash Photography" shown in FIGS. 10A and 10B is executed in Step S345.

If TVc>TVx (NO in Step S335), the ambient light flag is set in Step S350 upon judgment that the non-flash photography is suitable because TVc>TVx and the normal flash photography cannot be executed.

If TVx≧TVh (NO in Step S300), the subroutine proceeds to Step S355 in which it is discriminated whether the shake prevention shutter speed TVh is greater than the control shutter speed TVc. If TVc<TVh (YES in Step S355), the high speed synchronization flag is set in Step S360 and the subroutine "Light Amount Calculation in Normal Flash Photography" shown in FIGS. 10A and 10B is executed in Step S375. If TVc≧TVh (NO in Step S355), the ambient light flag is set in Step S370 upon judgment that the non-flash photography is suitable because TVc>TVx and the camera shake is highly unlikely to occur.

The operations of Steps S355 and S360 are carried out when the normal flash firing is judged to be suitable since the camera shake may occur because TVx>TVh and TVc<TVh and since the normal flash firing is possible because TVc<TVx.

Figure 12:
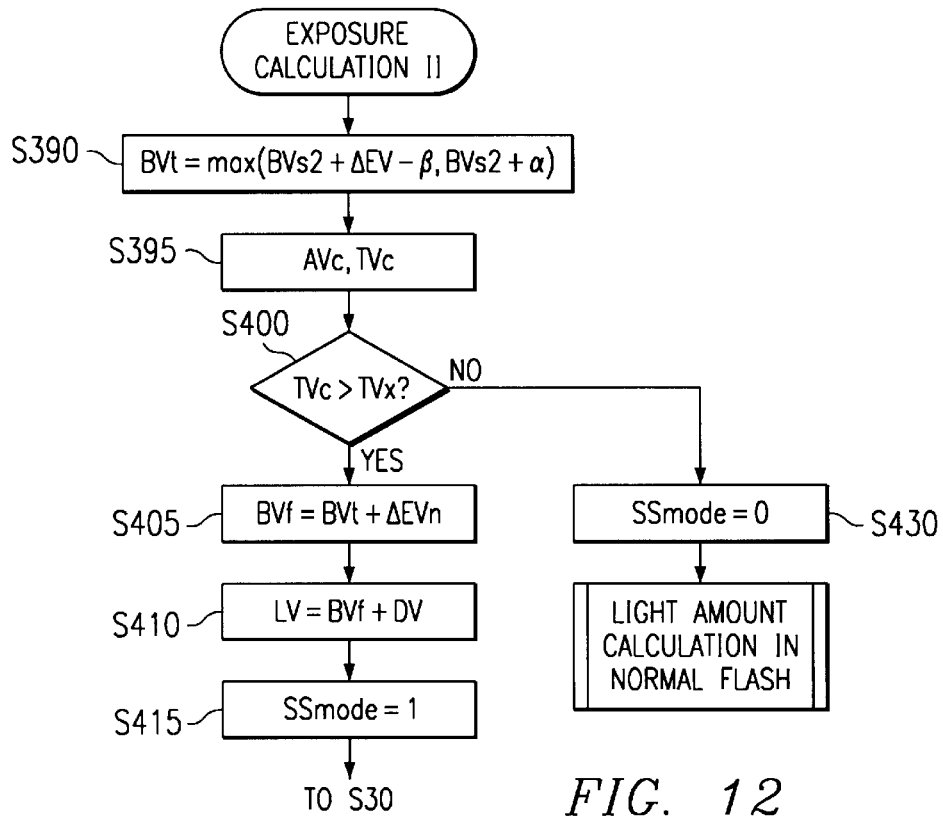
FIG. 12 is a flowchart showing an operation sequence of a subroutine "Exposure Calculation II" of the system main routine.
Figure 13:
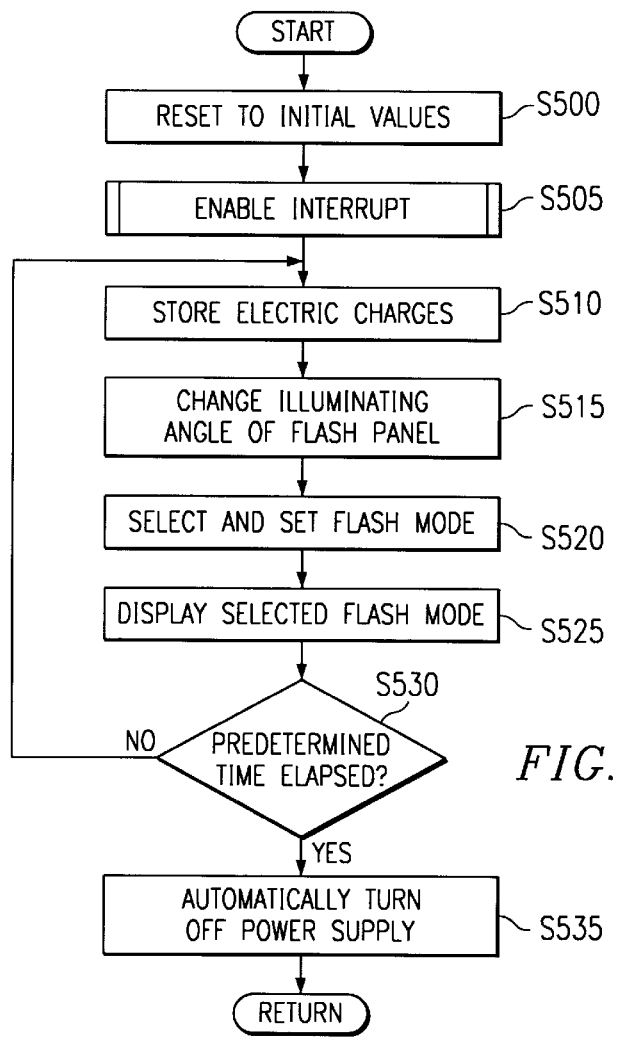
FIG. 13 is a flowchart showing a main operation routine of the flash device.

Next, the subroutine "Exposure Calculation II" will be described with reference to FIG. 12. This subroutine is executed when one of the S-mode, A-mode, and M-mode is selected.

The control aperture value AVc and the control shutter value TVc are determined in Steps S390 and S395 in similar to those of Steps S100 and S105 in the subroutine "Exposure Calculation I".

The operations in Steps S400 to S415 are carried out when the high speed synchronized flash photography is judged to be suitable because TVx>TVc. Specifically, in Step S400, it is discriminated whether the control shutter speed TVc is greater than the flash synchronized shutter speed TVx, i.e., whether the control shutter speed TVc requires the high speed synchronization.

If TVc>TVx (YES in Step S400), the flash control brightness BVf is calculated in the same manner as in Step S115. Subsequently, in Step S410, the control light intensity LV (LV=BVf+DV) is calculated based on the brightness BVf and the object distance DV. In Step S415, the high speed synchronization flag is set.

In this subroutine, no discrimination is made as to whether the control light intensity LV is within the flash photographable range (LVmin≦LV≦LVmax). However, this discrimination may be made in this subroutine and LV may be replaced with LVmin or LVmax if LV<LVmin or LVmax<LV.

If TVc≦TVx (NO in Step S400), the high speed synchronization flag is reset in Step S430 since the normal flash photography is judged to be suitable because the TVx>TVc, and then the subroutine "Light Amount Calculation in Normal Flash Photography" shown in FIGS. 10A and 10B is executed in Step S435.

Next, operations which is carried out in the flash device 3 will be described with reference to flowcharts shown in FIGS. 13 to 17.

The CPU provided in the flash device 3 is reset in Step S500. In this step, data concerning the zooming, display and communication are reset to initial values. In Step S505, an interrupt is enabled. The interrupt occurs: 1) when the data are transmitted from the flash device 3 to the camera device 1 in Step S15 of the main routine or Case W: 2) when the data are transmitted from the camera device 1 to the flash device 3 in Step S30 of the main routine or Case R; and 3) when the exposure is carried out or Case REL.

In Step S510, electric charges necessary to fire the flash device 3 are stored in the capacitor and a display is made to indicate the completion of the charging. In Step S515, an illuminating angle of the flash panel 32 is changed in accordance with the focal distance data FV transmitted from the camera device 1.

In Step S520, a flash photography mode is selected and set according to the input made by operating the mode key of the flash device. In Step S525, the selected flash photography mode is displayed.

In Step S530, it is discriminated whether the flash device 3 has not been operated during a predetermined time. This step is provided to save power by automatically turning off the power supply when the flash device 3 has not been operated during the predetermined time. If the discrimination result is in the affirmative, the power supply is automatically turned off in Step S535.

Figure 14:
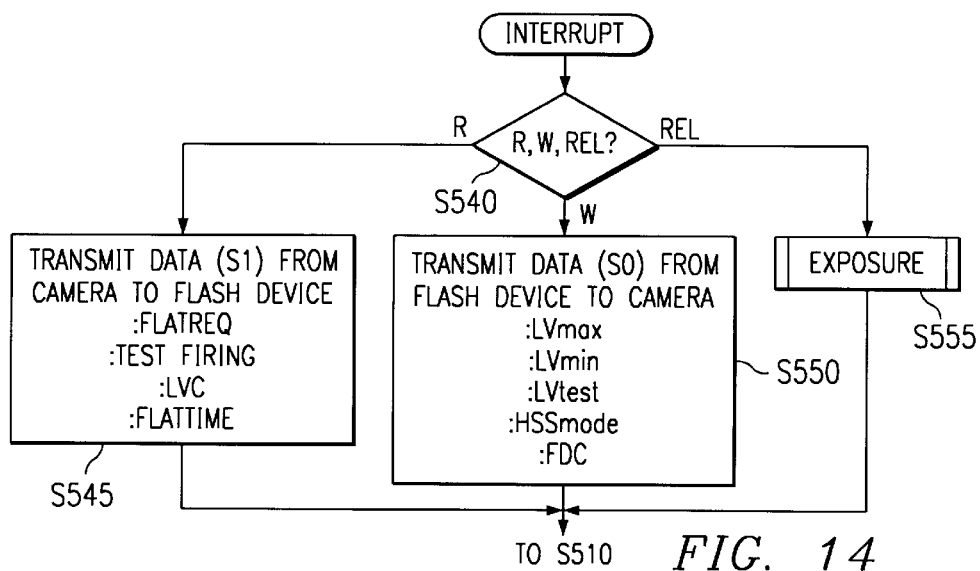
FIG. 14 is a flowchart showing an operation sequence of a subroutine "Interrupt" of the flash main routine.

An interrupt routine executed after the interrupt is enabled in Step S505 is described with reference to a flowchart shown in FIG. 14. When the interrupt occurs in Step S505, it is discriminated whether this interrupt is the case R, the case W or the case REL in Step S540.

In the event of the case R, the data including FLATREQ, test firing, LVC and FLATTIME, i.e., the SI data are transmitted from the camera device 1 to the flash device 3 in Step S545. In the event of the case W, the data including LVmax, LVmin, LVtest and FDC, i.e., the SO data are transmitted from the flash device 3 to the camera device 1 in Step S550. In the event of the case REL, the exposure is carried out in Step S555.

Figure 15:
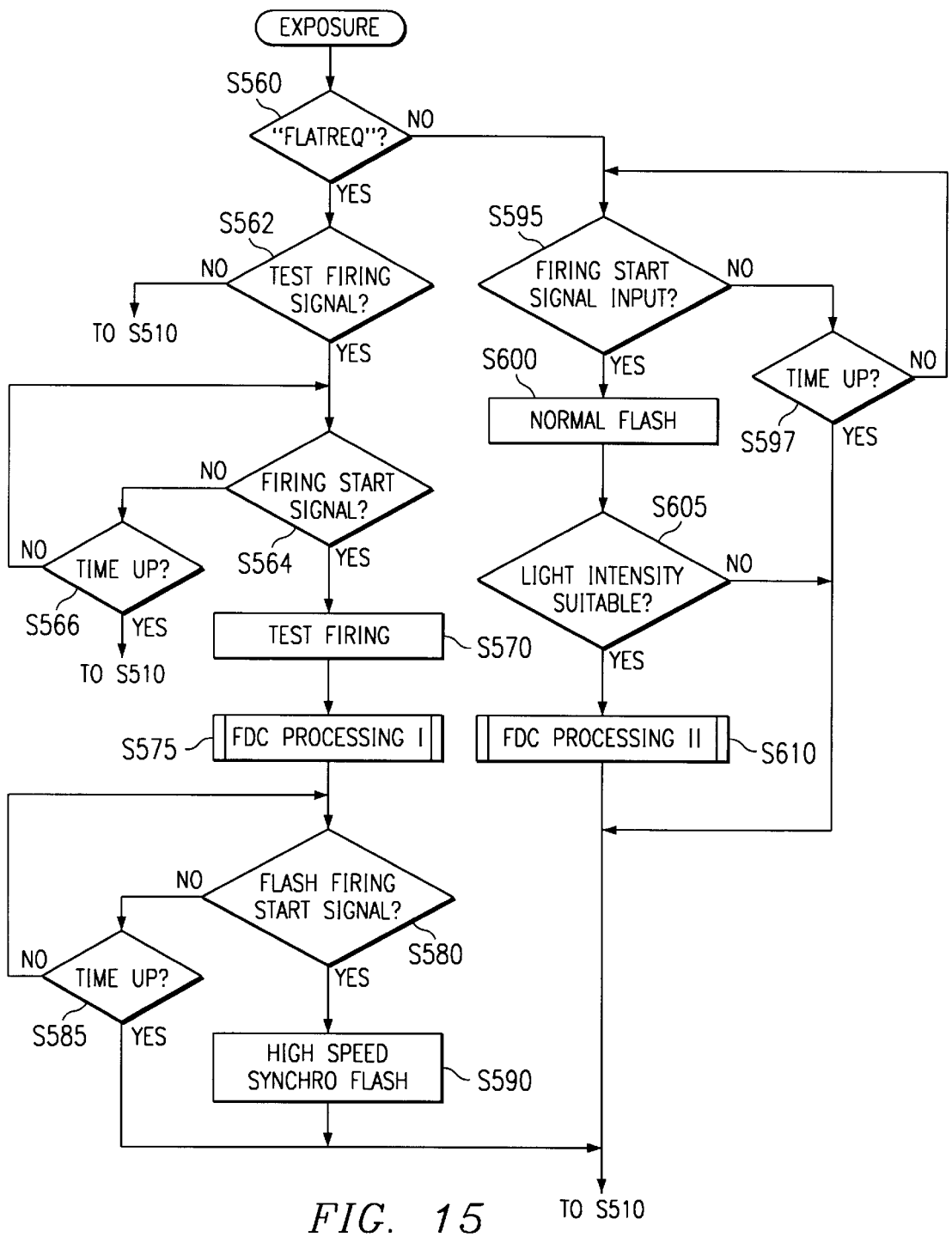
FIG. 15 is a flowchart showing an operation sequence of a subroutine "Exposure" of the "Interrupt" subroutine.

The subroutine "Exposure" which is executed in Step S555 will be described with reference to FIG. 15. In Step S560, it is discriminated whether the camera device 1 is requesting the high speed synchronized photography. If the discrimination result in Step S560 is in the affirmative, it is discriminated in Step S562 whether a test firing signal has been inputted. The test firing signal is transmitted from camera device 1 to the flash device 3 to determine the data LVC.

If the flash device 3 receives the test firing signal (YES in Step S562), this subroutine proceeds to Step S564 in which it is discriminated whether the flash firing start signal is inputted. If the discrimination result in Step S564 is in the affirmative, the test firing is carried out in Step S570. If the discrimination result in Step S564 is in the negative, it is discriminated in Step S566 whether the flash firing start signal is inputted for a predetermined period. If the flash firing start signal is inputted within the predetermined period, this subroutine returns to Step S510.

The operations in Steps S562 to S570 are carried out in the first and second modes wherein the test firing is carried out. These operations are unnecessary in the third and fourth modes.

Subsequently, this subroutine proceeds to Step S575 in which a subroutine "FDC Processing I" is executed to make in the camera device a display that the charging has been completed and to make in the flash device 3 a display that the flash firing can be started.

In Step S580, it is discriminated whether the flash firing start signal is inputted. If the flash firing start signal is inputted (YES in Step S580), the high speed synchronized flash photography is executed in Step S590. If the flash firing start signal is inputted (NO in Step S580), it is discriminated in Step S585 whether the flash firing start signal is inputted for a predetermined period. If the flash firing start signal is inputted within the predetermined period, this subroutine returns to Step S510.

If the discrimination result in Step S560 is in the negative, it is discriminated whether the flash firing start signal is inputted in Step S595. If the discrimination result in Step S595 is in the affirmative, the normal flash photography is executed in Step S600. If the discrimination result in Step S595 is in the negative, it is discriminated in Step S597 whether the flash firing start signal is inputted for a predetermined period. If the flash firing start signal is inputted within the predetermined period, this subroutine returns to Step S510.

In Step S605, it is discriminated whether the control light Intensity is suitable. This step is provided to judge whether the exposure is properly performed by the normal flash photography carried out in Step S600. In Step S610, the subroutine "FDC Processing II" is executed. The operations in Steps S595 to S610 are an exposure operation when the normal flash photography is carried out.

Figure 16:
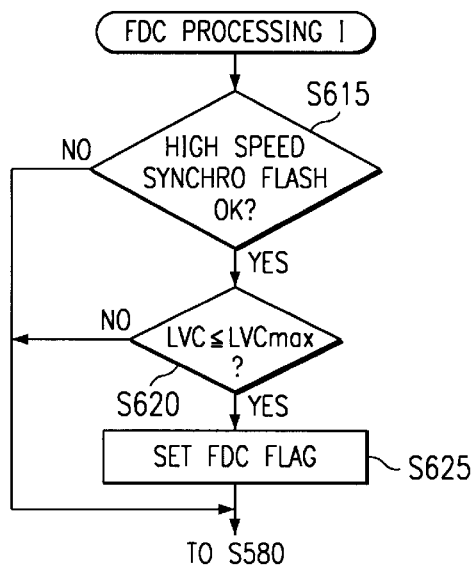
FIG. 16 is a flowchart showing an operation sequence of a subroutine "FDC processing I" of the "Exposure" subroutine
Figure 17:
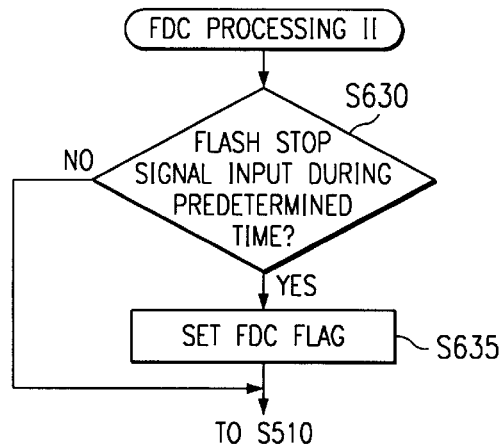
FIG. 17 is a flowchart showing an operation sequence of a subroutine "FDC processing II" of the "Exposure" subroutine.

FIG. 16 is a flowchart showing the subroutine "FDC Processing I" for the high speed synchronized flash photography. FIG. 17 is a flowchart showing the subroutine "FDC Processing II) for the normal flash photography.

In the subroutine "FDC Processing I", it is discriminated in Step S615 whether the high speed synchronized flash photography is executable based on the results of the test firing. If it is unexecutable (NO in Step S615), this subroutine returns to Step S580.

If it is executable (YES in Step S615), this subroutine proceeds to Step S620 in which it is discriminated whether LVC≦LVCmax. This discrimination step is provided because LVCmax varies depending upon the voltage of the battery, the time FLATTIME during which the high speed synchronized flash photography is executed, and other factors. If the discrimination result in Step S620 is in the affirmative, the FDC flag is set in Step S625.

In the subroutine "FDC Processing II", it is discriminated in Step S630 whether the flash firing stop signal has been inputted during a predetermined Period. The FDC flag is set in Step S635 if the discrimination result in Step S630 is in the affirmative, while this subroutine returns if it is in the negative.

The automatic selection of the non-flash photography, normal flash photography, and high speed synchronized flash photography in this embodiment will be summed up as follows.

However, it should be noted that an effective illumination coverage of the flash light in the normal flash photography is larger than the one when the high speed synchronized flash photography is executed. Also, TVc denotes the control shutter speed calculated in Step 25, TVx the flash synchronized shutter speed, and TVh the shake preventing shutter speed. The camera shake may occur when TVc<TVh in the dark. This occurrence can be prevented by carrying out the normal flash firing (pulse firing). The high speed synchronized flash firing requires less power than the normal flash firing.

(A) Automatic flash firing in the dark in the P-mode (the case where the flash device 3 is automatically fired in the P-mode because the object is dark)

[1] TVh<TVx and TVh<TVc:
 The high speed synchronized flash photography is executed at the control shutter speed TVc during the main firing.

[2] TVh<TVx and TVc<TVh:
 The normal flash photography is carried out at the flash synchronized shutter speed TVx during the main firing.

[3] TVx<TVh, TVc<TVx and the main object is located within a high speed synchronized flash effective range:
 The high speed synchronized flash photography is executed at the shake prevention shutter speed TVh during the main firing.

[4] TVx<TVh. TVc<TVh, and the main object is located outside the high speed synchronized flash effective range:
 The normal flash photography is carried out at the flash synchronized shutter speed TVx during the main firing.

[5] TVx<TVh, TVc<TVh, and the main object is located within the high speed synchronized flash effective range:
 The high speed synchronized flash photography is executed at the shake prevention shutter speed TVh during the main firing.

[6] TVx<TVc, TVc<TVh, and the main object is located outside the high speed synchronized flash effective range:
 The non-flash photography is executed at the control shutter speed TVc. If the main object brightness is −2 EV or larger, the high speed synchronized flash photography is executed.

(B) Automatic flash firing against the light in the P-mode (the case where the flash device 3 is automatically fired when the against-the-light condition is discriminated in the P-mode)

[7] TVc<TVx:
 The normal flash photography is carried out at the control shutter speed TVc during the main firing.

[8] TVx<Tc and the main object is located within the high speed synchronized flash effective range:
 The high speed synchronized flash photography is executed at the control shutter speed TVc during the main firing.

[9] TVx<TVc, the main object is located outside the high speed synchronized flash effective range, but within the normal flash effective range and a proper exposure can be obtained when the flash photography is executed at the flash synchronized shutter speed TVx during the main firing:
 The normal flash photography is carried out at the flash synchronized shutter speed TVx during the main firing.

[10] TVx<TVc, the main object is located outside the high speed synchronized flash effective range, but within the normal flash effective range and the exposure is excessive when the flash photography is executed at the flash synchronized shutter speed TVx during the main firing:
 The non-flash photography is executed at the control shutter speed TVc during the main firing.

[11] TVx<TVc, the main object is located outside the high speed synchronized flash effective range and outside the normal flash firing effective range:
 The non-flash photography is executed at the control shutter speed TVc during the main firing.

(C) Forcible flash firing in the P-mode (the case where the operator forcibly fires the flash device 3 in the P-mode)

[12] TVc≦TVx: The normal flash photography is carried out at the control shutter speed TVc during the main firing.

[13] TVx<TVc and the main object is located within the high speed synchronized flash effective range:
 The high speed synchronized flash photography is executed at the control shutter speed TVc during the main firing.

[14] TVx<TVc, the main object is located outside the high speed synchronized flash effective range, but a proper exposure can be obtained when the flash photography is executed at the flash synchronized shutter speed TVx during the main firing:
 The normal flash Photography is carried out at the flash synchronized shutter speed TVx during the main firing.

[15] TVx<TVc, the main object is located outside the high speed synchronized flash effective range and the exposure is excessive when the flash photography is executed at the flash synchronized shutter speed TVx during the main firing:
 The high speed synchronized flash photography is executed at the control shutter speed TVc during the main firing.

(D) Forcible flash firing in the A-mode (the case where the operator forcibly fires the flash device 3 in the A-mode)

[16] TVc≦TVx:
 The normal flash photography is carried out at the control shutter speed TVc during the main firing.

[17] TVx≦TVc and the main object is located with the high speed synchronized flash effective range:
 The high speed synchronized flash photography is executed at the control shutter speed TVc during the main firing.

[18] TVx≦TVc and the main object is located outside the high speed synchronized flash effective range:
 The high speed synchronized flash photography is executed at the control shutter speed TVc during the main firing, or the non-flash photography is executed at the flash synchronized shutter speed TVx.

(E) Forcible flash firing in the S-mode and the M-mode (the case where the operator forcibly fires the flash device 3 in the S-mode and the M-mode)

[19] TVc≦TVx:
 The normal flash photography is carried out at the control shutter speed TVc during the main firing.

[20] TVx≦TVc:
 The high speed synchronized flash photography is executed at the control shutter speed TVc during the main firing.

Next, each mode of the high speed synchronized flash photography which is executed in Step S55 of the main routine will be described in detail.

Figure 18:
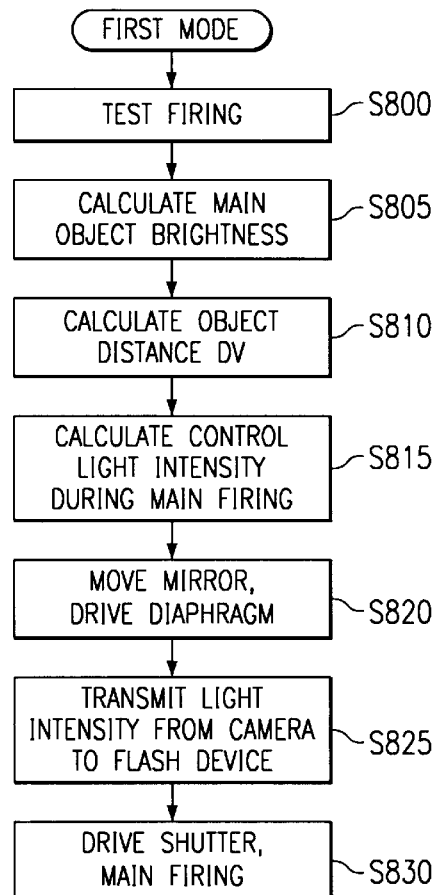
FIG. 18 is a flowchart showing an operation sequence of a subroutine "FIRST MODE" of the high speed synchronized flash photography.

Operations of the first mode will be described with the flowchart shown in FIG. 18. As described above, the light intensity LVC during the main firing is calculated based on the object distance DV obtained as a result of the test firing. The test firing is carried out in Step S800; the main object brightness during the test firing is calculated in Step S805; and the object distance DV is calculated in Step S810.

Here is described an operation expression for calculating the object distance DV by carrying out the test firing. First, terms used in this operation expression are described. BV1 denotes a main object brightness under the ambient light; BV2 a main object brightness during the test firing; and LVtest a flash light intensity during the test firing. If a change in the main object brightness caused by the test firing is defined as BV3 (BV3=BV2-BV1), the object distance DV is calculated in accordance with the following operation expression:

$$DV=LVtest-BV1-\log_2(2^{BV3}-1).$$

In Step S815, the control light intensity LV (LV=BVf+DV) during the main firing is calculated based on the object distance DV and the flash control brightness BVf. In Step S820, the mirror is moved to the retracted position and the diaphragm is driven to attain the control aperture value. In Step S825, the control light intensity LVC during the main firing calculated in Step S815 is transmitted from the camera to the flash device before the travel of the front and rear blinds. In Step S830, the front and rear blinds are caused to travel and the main firing is carried out.

Figure 19:
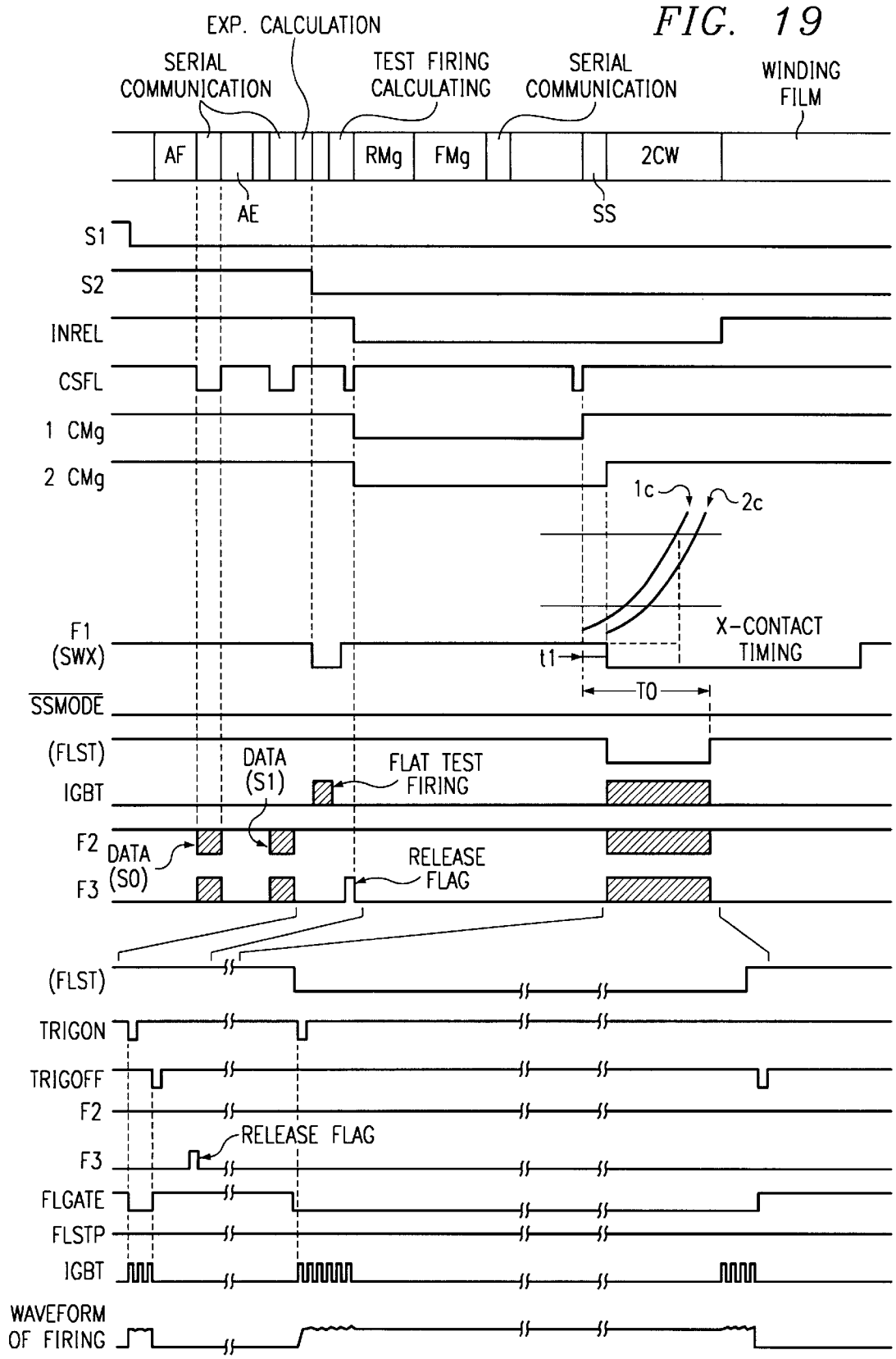
FIG. 19 is a timing chart showing an operational relationship in the first high speed synchronized flash photography mode.

FIG. 19 is a timing chart showing a relationship between principal parts of the camera systems. First, signs used in FIG. 19 are briefly described. During periods AE and AF, the light measurement is conducted and the taking lens is driven to attain an in-focus condition, respectively. During a period SC, the data are transmitted from the camera device 1 to the flash device 3 and vice versa through the serial communication. During periods RMg and FMg, the exposure control and the aperture control are executed. respectively. During a period SS, the travel of the front and rear blinds of the shutter is started according to the set shutter speed. During a period 2 CW, the both blinds travel, but at the end the front blind waits until the rear blind finishes its travel. During a period W, the film is wound.

Indicated atS1 and S2 are a light measurement start signal and a release signal, respectively. Indicated at INREL is a signal generated in the CPU provided in the camera device 1 during the exposure. Indicated at CSFL is a signal generated in the CPU provided in the camera device 1 during the communication with the flash device. Indicated at 1 CMg and 2 CMg are signals for causing the magnets for holding the front and rear blinds to generate a magnetic force and demagnetize the magnets, respectively. Indicated at F1 is a flash firing start signal.

Indicated at SSmode is a signal representing whether the high speed synchronized flash photography is to be executed or the normal flash photography is carried out. Indicated at FLST is a flash firing start signal generated in the CPU provided in the flash device 3. Indicated at IGBT is a signal generated in a circuit provided in the flash device 3 for turning the IGBT on and off with a high frequency to controllably start and stop the light emission.

Indicated at F2 is a signal for conducting the serial communication for the data (SO) transmitted from the flash device 3 to the camera device 1 and the data (SI) transmitted from the camera device 1 to the flash device 3. Indicated at F3 is a timing signal (clock) used to transmit the data SO and the data S1. Indicated at TRIGON is a signal for turning the IGBT on. Indicated at TRIGOFF is a signal for turning the IGBT off. Indicated at FLGATE is a signal for controlling the light measurement by the flash light. Indicated at FLSTP is a flash firing stop signal.

When the light measurement start switch S1 is turned on, the level of the signal S1 becomes "low", thereby carrying out the automatic focusing (AF). After the AF, the data are transmitted from the flash device to the camera (serial communication). The light measurement follows thereafter.

The serial communication is a data communication conducted in Step S15 and the data are inputted and outputted through the contact F2. Through the contact F3, the timing signal (clock) for transmitting the SO data and the SI data is output and the level of the signal CSFL becomes "low" during the serial communication.

Thereafter, the exposure calculation is performed and the calculation result is transmitted from the camera device 1 to the flash device 3. The above sequence is repeated until a release button is operated, i.e., the level of the release signal S2 becomes "low". When the release signal becomes "low", the level of the signal F1 becomes "low", and thereby the test firing is carried out to calculate the object distance DV.

Subsequently, the control light intensity during the main firing is calculated in accordance with an APEX equation (LV=BVf+DV) used in Step S120. Following the test firing and exposure calculation after the release button S2 is operated, a release flag data is transmitted from the camera device 1 to the flash device 3 through the contact F3. The level of the signal INREL is kept "low" until the travel of the front and rear blinds is completed after the start of the exposure. When the signal INREL is at the "low" level, the signal 1 CMg is kept at the "low" level until the travel of the front blind is started while the signal 2 CMg is kept at the "low" level until the travel of the rear blind is started. The front and rear blinds of the focal plane shutter are mechanically locked before the exposure, but are held by the magnetic force after the exposure. This construction is designed to cause the blinds to travel accurately.

The data (LVC) obtained as a result of the test firing is transmitted from the camera device 1 to the flash device 3 after the completion of the exposure and aperture controls. The signal FLST represents, a time tl after the start of the travel of the blinds, the state of a flag provided in the flash device 3 to express a time (T0-t1) in synchronism with the fall of the signal F1.

The level of the IGBT control signal changes between "high" and "low" levels with a high frequency while the flash device 3 is fired (T0-t1). The flash light emission is on-off controlled in accordance with this signal.

Next, the second high speed synchronized flash photography mode will be described. The camera device 1 is controlled in accordance with the main routine shown in FIG. 7. The contents of data transmitted during the communication in Steps S15, S30 and S55 are described with reference to the table shown in FIG. 8.

In Step S15, the data are transmitted from the flash device 3 to the camera device 1. Specifically, the data transmitted in this step include: a data IV (a signal representing an amount of flash light), a data SSEN (a signal representing that the flash device 3 is capable of executing the high speed synchronized flash photography), data IVtest (a signal representing an amount of flash light during the test firing), a data IVmax (a signal representing a maximum realizable amount of the flash light), a data IVmin (a signal representing a minimum realizable amount of the flash light) and a data LVt (a signal representing the intensity of the flash light t-seconds after the test firing).

The data transmitted from the camera device 1 to the flash device 3 in Step S30 include: a data DV (a signal representing the object distance), a data TV (a signal representing the shutter speed), a data FV (a signal representing the focal length), a data SV (a signal representing the film sensitivity), a data AV (a signal representing the aperture value), a data NOTFIRE (a signal representing whether the flash device is to be fired), a data FLATREQ (a signal for starting the high speed synchronized flash photography) and a data FLAT-TIME (a signal representing a time during which the high speed synchronized flash photography is executed). In Step S55, a data IVC (a signal representing an amount of light to be emitted per pulse) is transmitted. The data IVC is calculated based on the object distance data DV obtained as a result of the test firing for the same reason in the first mode.

Figure 20:
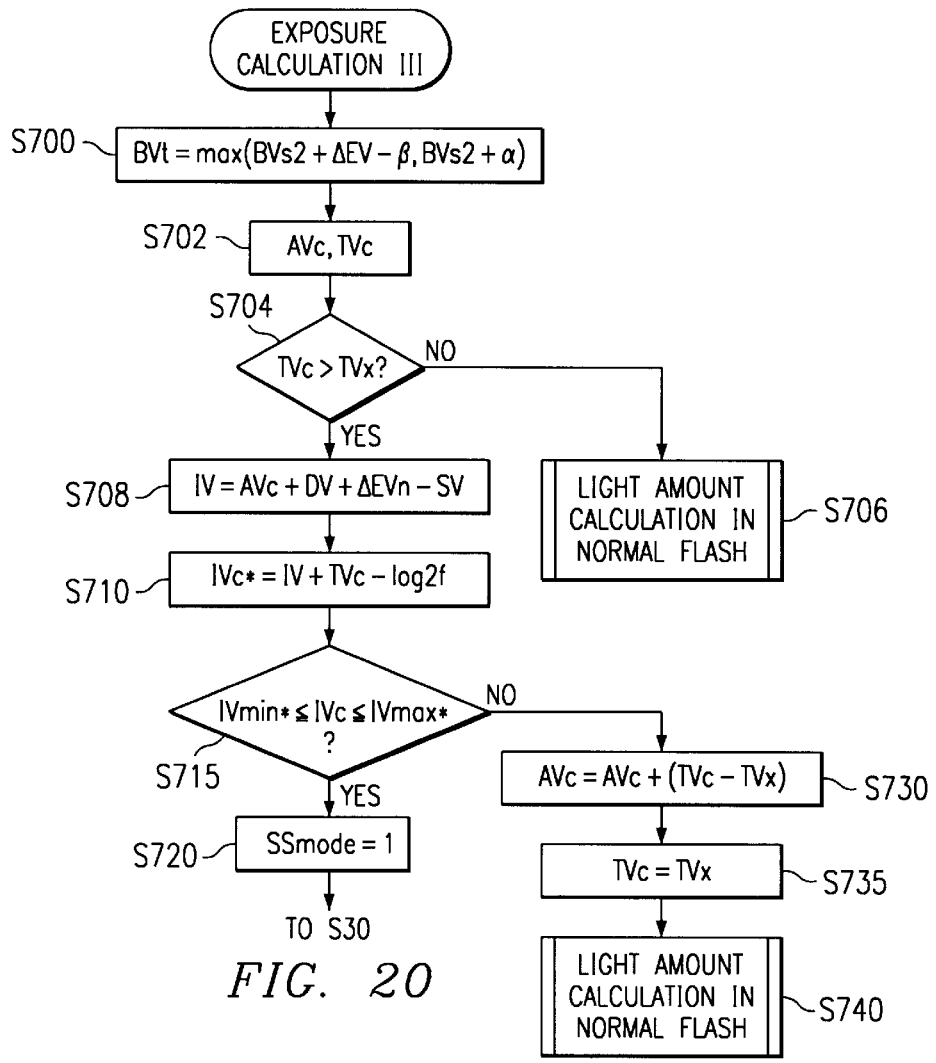
FIG. 20 is a flowchart showing a subroutine "Exposure Calculation III" of the system main routine.

The second mode is executed based on the amount of light. Accordingly, the results of the above-mentioned "Exposure Calculation I" and "Exposure Calculation II" will not used for the second mode. FIG. 20 shows operations of an "Exposure Calculation III" which is to be used in the second mode.

Figure 9A:
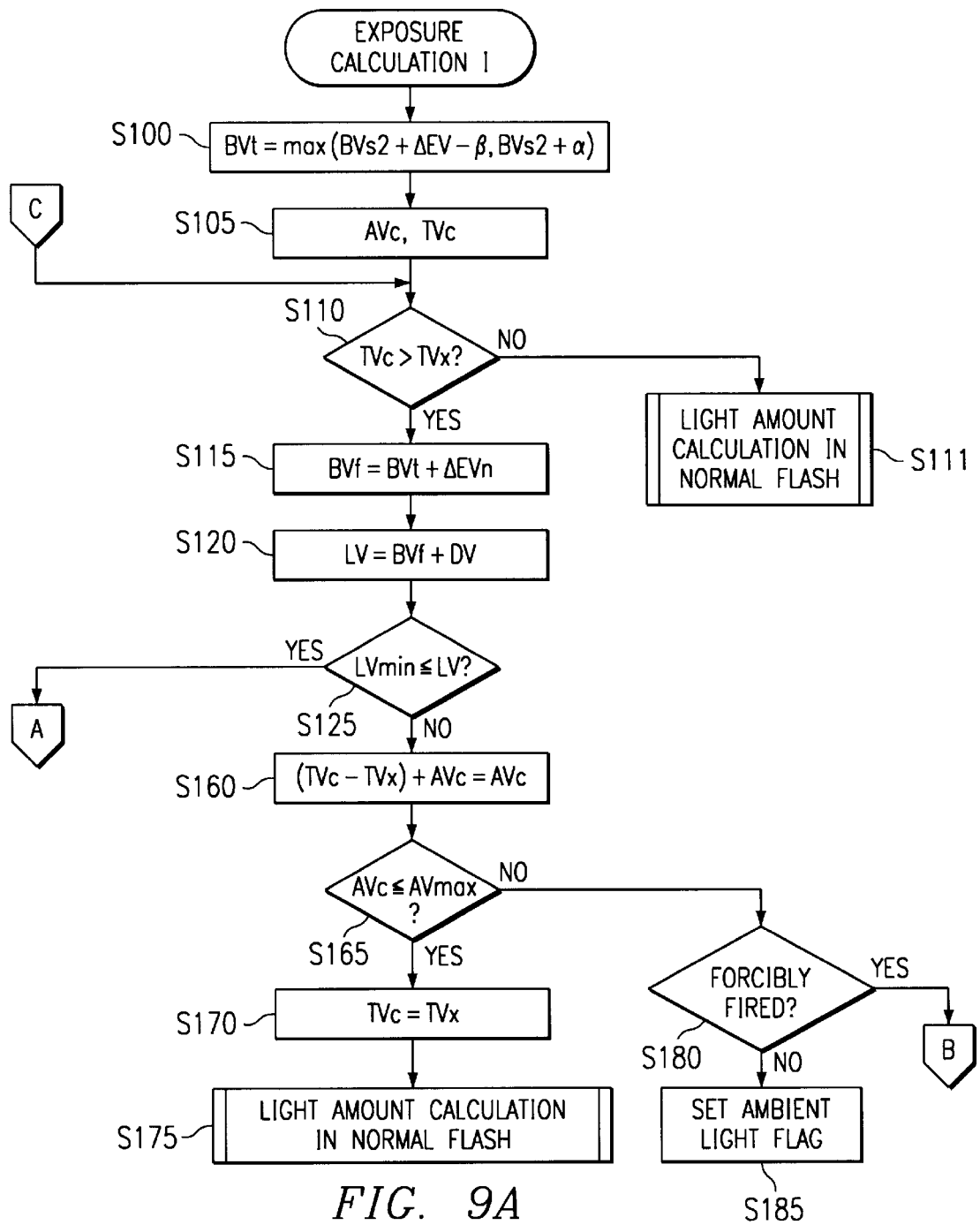
FIGS. 9A and 9B are flowcharts combinedly showing an operation sequence of a subroutine "Exposure Calculation I" of the system main routine.
Figure 9B:
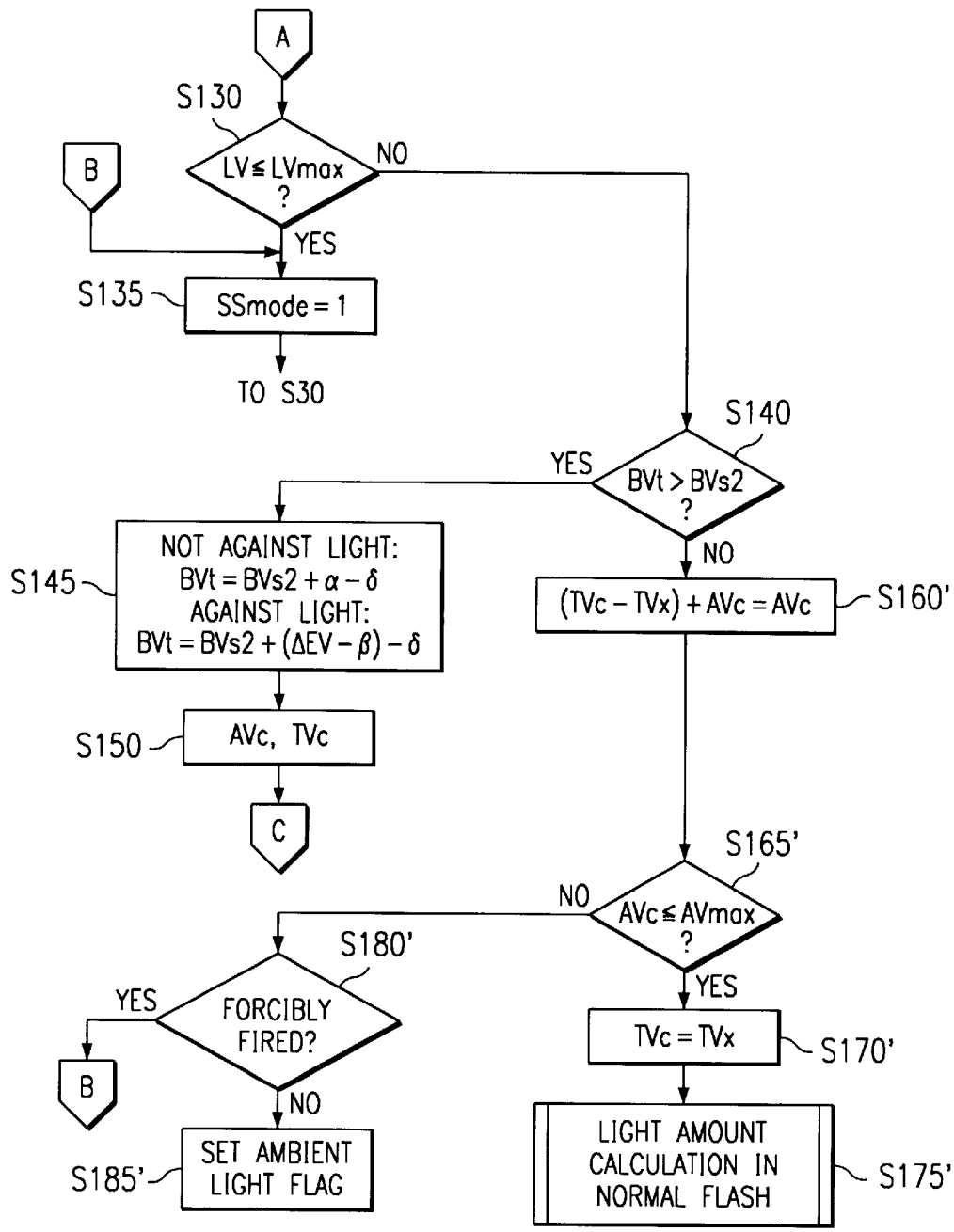

The control aperture value AVc and the control shutter value TVc are determined in Steps S700 and S702 similar to Steps S100 and S105 of the subroutine "Exposure Calculation I" shown In FIG. 9A.

The operations In Step S704 to S720 are carried out when the pulse light amount calculated based on the total amount IV of flash light to be emitted during the exposure, the control shutter speed, and the firing frequency f is within the flash photographable range. Specifically, in Step S704, it is discriminated whether the control shutter speed TVc is greater than the flash synchronized shutter speed TVx. In this step, it is judged whether the high speed synchronized flash photography is necessary.

If the discrimination result is in the affirmative, the total amount IV of flash light emitted during the exposure is calculated in Step S708 similar to Step S200 (shown in FIG. 10A) of the subroutine "Light Amount Calculation in Normal Flash Photography" which is executed when the normal flash photography is carried out.

Subsequently, in Step S710, the pulse light amount IVC is calculated based on the total light amount IV, control shutter speed TVc and firing frequency f (IVC=IV+TVc−$\log_2$f). The firing frequency f may be a predetermined frequency set in advance in the camera device or may be variable according to the shutter speed.

If the discrimination result in Step S704 is in the negative, the subroutine "Light Amount Calculation in Normal Flash Photography" shown in FIGS. 10A and 10B is executed in Step S706. The object distance data DV used in Step S708 is calculated based on the defocus amount as in the first mode.

In Step S715, it is discriminated whether IVmin*≦IVC≦IVmax*. IVmin* and IVmax* denote minimum and maximum pulse light amounts during the flash firing, respectively. In this step, it is judged whether the flash photography is executable with the pulse light amount IVC. The high speed synchronization flag is set in Step S720 if the discrimination result in Step S715 is in the affirmative, while this routine proceeds to Step S730 if it is in the negative.

The operations in Steps S730 to S740 are carried out when the flash photography cannot be executed with the pulse light amount IVC calculated in Step S710. Specifically, in Step S730, a new control aperture value is calculated by adding a difference between the control shutter speed TVc and the flash synchronized shutter speed TVx (TVc−TVx) to the old control aperture value. In Step S735, the control shutter speed TVc is set to the flash synchronized shutter speed TVx. In Step S740, the subroutine "Light Amount Calculation in Normal Flash Photography" shown in FIGS. 10A and 10B is executed.

Figure 21:
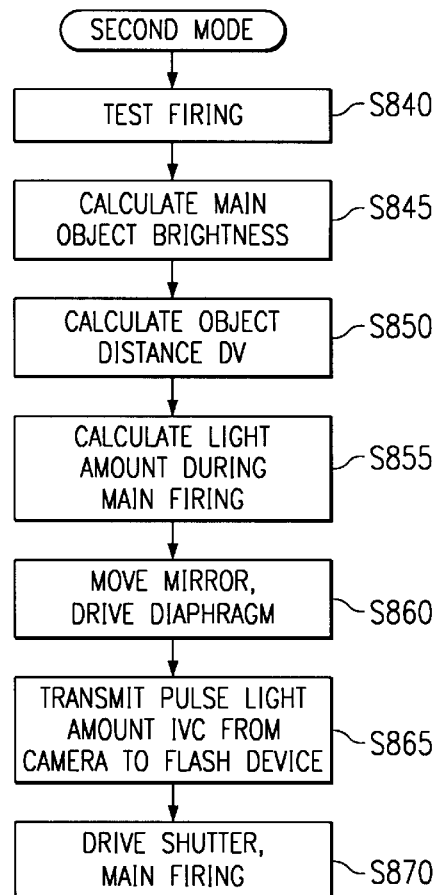
FIG. 21 is a flowchart showing an operation sequence of a subroutine "SECOND MODE" of the high speed synchronized flash photography.

The second high speed synchronized flash photography mode which is to be executed in Step S55 of the main routine will be described with reference to FIG. 21. As in the first mode, the test firing is carried out in the second mode to obtain the main object brightness. The object distance DV is calculated based on the thus obtained main object brightness during the test firing and the main object brightness under ambient light. The pulse light amount during the main firing is calculated based on the object distance DV. The test firing is carried out in Step S840; the main object brightness during the test firing is calculated in Step S845; and the object distance DV is calculated in Step S850.

Here is described how the object distance DV is calculated as a result of the test firing in the second mode. BV1 denotes the main object brightness under ambient light, BV4 the main object brightness t-seconds after the start of the test firing, and LVt the light intensity t-seconds after the start of the test firing. If BV5 denotes a change in the main object brightness under the influence of the test firing (BV5=BV4−BV1), the object distance DV is calculated in accordance with the following equation:

DV=LVt−BV1−$\log_2(2^{BV5}-1)$

If the light amount during the test firing is fixed, LVt is a known data, which may be obtained by detecting the light intensity t-seconds after the start of the test firing using the photosensor 34 disposed at the bottom of the flash panel 32. Another method may be such that the object distance is calculated based on a difference between a specified amount of flash light emitted during the test firing (an amount of light received by a photosensor at a predetermined distance from the flash device) and an amount of flash light received by the photosensor during the photographing operation (an amount of light received at a photographing distance).

Subsequently, in Step S855, the light amount during the main firing is calculated based on the thus calculated object distance DV. The pulse light amount IVC during the main firing is calculated based on the total light amount IV calculated in accordance with the APEX equation (IV=AVc+ΔEVn+DV−SV) shown in Step S708, the control shutter speed TVc and the firing frequency f (IVC=IV+TVc−$\log_2$f)

In Step S860, the mirror 11 is moved to the retracted position and the diaphragm is driven to attain the control aperture value. In Step S865, the pulse light amount IVC calculated in Step S855 is transmitted from the camera device 1 to the flash device 3. In Step S870, the front and rear blinds of the shutter are caused to travel and the main firing is carried out.

There will be described the operation of the flash control circuit shown in FIG. 6 during the high speed synchronized flash photography in the second mode. When the flash firing is started, a "low" level output is fed from the terminal TRIGON to the set terminal of the flip-flop, which in turn feeds a "high" level output. A "high" level output is always fed to the AND2 since a "high" level output is always fed from the terminal F/PMODE to the OR4. Thus, the IGBT control signal is at "high" level during the flash firing. The IGBT control signal corresponds to the output of the flip-flop independent of the output of the comparator COMP. Since a "high" level output is fed from the terminal F/PMODE to the NAND2, the output of the NAND2 is determined by the input from the OR3. An output from the NAND1 is fed to one of the input terminals of OR3. Outputs from the contacts F2 and F3 are fed to one of the input terminals of the NAND1. The "high" level output and "low" level output are always fed from the contacts F2 and F3 during the flash firing, respectively. Thus, a "high" level output is fed from the OR1 to one of the input terminals of the NAND1.

This construction is employed so that the flash firing can be switchingly controlled from the camera device 1 or in the flash device 3. An output of the OR2 to which the outputs of the terminals FLSTP, FLGATE are fed is fed to the other input terminal of the NAND1. Thus, the output of the NAND1 is controlled by the signals from the flash control circuit. While "low" level and "high" level outputs are fed from the terminals TRIGON and FLSTP respectively during the flash firing, the IGBT control signal is at "high" level. The IGBT control signal is kept at "low" level until a "low" level output is fed from the terminal TRIGON again. By changing the level of the IGBT control signal between "high" and "low" with a high frequency, the high-frequency pulse firing can be continuously carried out.

Figure 22:
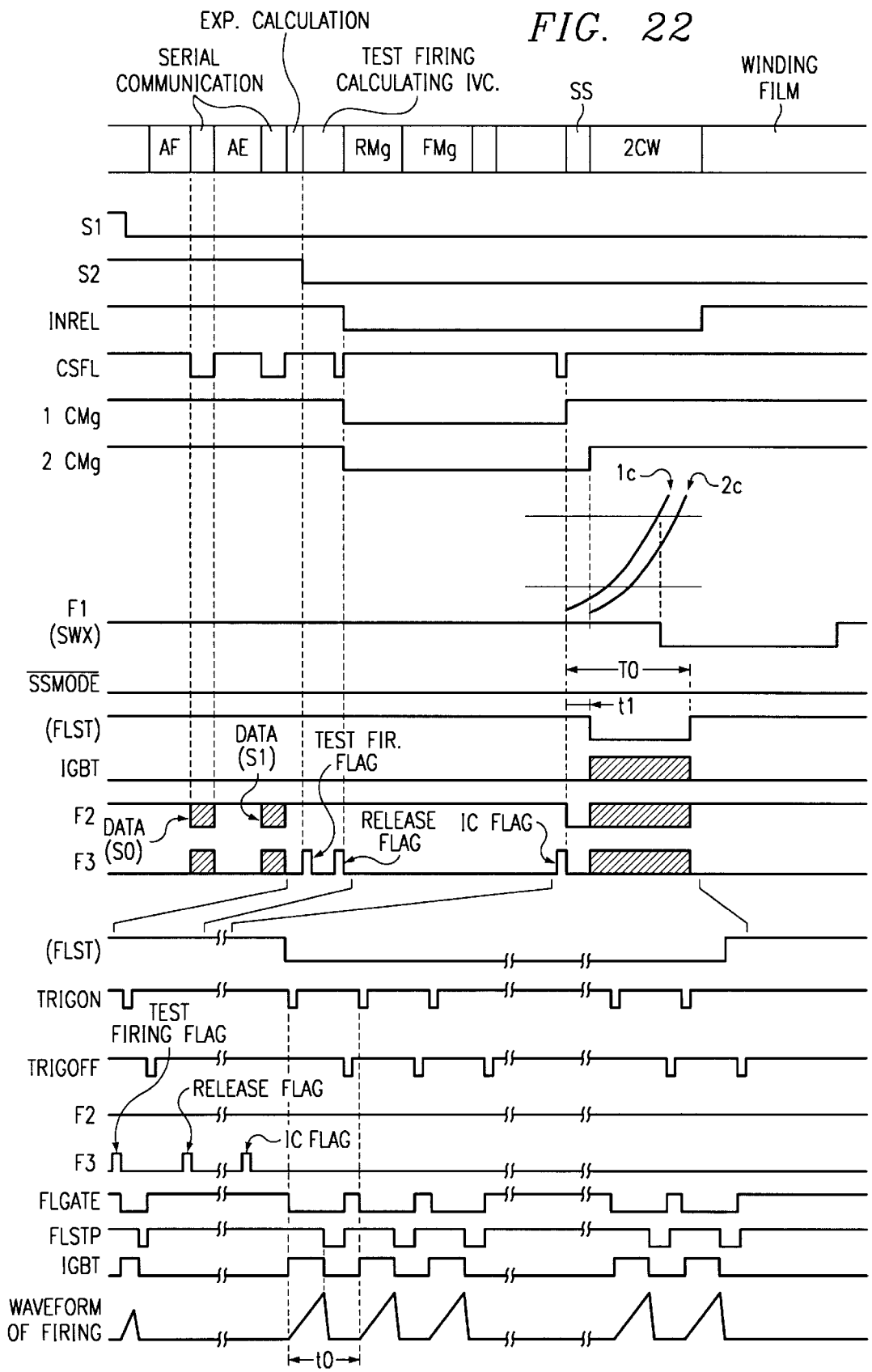
FIG. 22 is a timing chart showing an operational relationship in the second high speed synchronized flash photography mode.

The high speed synchronized flash photography in the second mode is described with reference to a timing chart shown in FIG. 22. When the light measurement start switch S1 is turned on, the level of the light measurement start signal S1 becomes "low", and thereby the automatic focusing is performed. After the automatic focusing, the data are transmitted from the flash device to the camera (serial communication) and then the light measurement is performed.

This serial communication is the one conducted in Step S15 and the data are transmitted through the contact F2. Through the contact F3 is outputted a timing signal (clock) for transmitting the SO data and SI data. The level of the CSFL signal is "low" during the serial communication. Thereafter, the exposure calculation is performed and the calculation result is transmitted from the camera device 1 to the flash device 3. The above operations are repeated until the release button is operated, i.e., the level of the release signal S2 becomes "low".

When the release signal becomes "low", the level of the signal F1 becomes "low", and thereby the test firing is carried out to calculate the object distance DV. Then, the pulse light amount IVC during the main firing is calculated in accordance with the APEX equations (IV=AVc+DV+ΔEVn−SV and IVC=IV+TVc−$Log_2$f) shown in Steps S708 and S710.

After the test firing is carried out and the exposure calculation is completed following the fall of the release signal S2, the release flag data is transmitted from the camera device 1 to the flash device 3 through the contact F3.

The level of the signal INREL is kept "low" until the travel of the front and rear blinds of the shutter is completed after the start of the exposure. When the level of the signal INREL becomes "low", the level of the signal 1 CMg becomes "low" until the front blind starts traveling and the level of the signal 2 CMg becomes "low" until the rear blind starts traveling.

The data IVC obtained as a result of the test firing is transmitted from the camera device 1 to the flash device 3 after the periods RMg and FMg during which the exposure control and the aperture control are executed. The signal FLST represents, a time tl after the start of the travel of the blinds, the state of the flag in the flash device 3 for representing a time (T0−t1) in synchronism with the fall of the signal F1.

After the front blind finishes its travel, a "low" level output is fed from the terminal TRIGON to the set terminal of the flip-flop, which in turn feeds a "high" level output. Since a "high" level output is always fed from the terminal F to the OR4, a "high" level output is always fed to the AND2 and the level of the IGBT control signal during the flash firing is "high". Thus, the IGBT control signal corresponds to the output of the flip-flop independent of the output of the comparator COMP. Since a "high" level output is fed from the terminal F/PMODE to the NAND2, the output of the NAND2 is determined by the input from the OR3. The output of the NAND1 is fed to one of the input terminals of the OR3. The output of the OR1 to which the outputs of the contacts F2 and F3 are fed is fed to one of the input terminals of the NAND1. The "high" level and "low" level outputs are always fed from the contacts F2 and F3 during the flash firing, respectively. Thus, a "high" level output is fed from the OR1 to one of the terminals of the NAND1. This construction is employed so that the flash firing can be switchingly controlled from the camera or in the flash device.

An output of the OR2 to which the outputs of the terminals FLSTP, FLGATE are fed is fed to the other input terminal of the NAND1. Thus, the output of the NAND1 is controlled by the signals (FLSTP, FLGATE) from the flash control circuit. When the level of the signal TRIGON becomes "low", the level of the IGBT control signal becomes "high", thereby starting the flash firing. Thereafter, when the level of the signal FLSTP becomes "low", the level of the IGBT control signal becomes "low", thereby stopping the flash firing.

The high-frequency pulse firing can be continuously carried out by changing the level of the IGBT control signal "high" and "low" with a high frequency (during a time (T0−t1).

Next, the third mode of the high speed synchronized flash photography will be described in detail. In the third mode as well, the camera device 1 is controlled in accordance with the operation sequence described with reference to FIG. 7.

The contents of data transmitted during the data communication in Steps S15, S30 and S55 are described for each mode with reference to the table shown in FIG. 8. In Step S15, the data are transmitted from the flash device 3 to the camera device 1. The data transmitted in this step include a data IV (a signal representing an amount of flash light), a data SSEN (a signal representing that the flash device 3 is capable of executing the high speed synchronized flash Photography), a data IVmax (a signal representing a maximum realizable amount of the flash light) and a data IVmin (a signal representing a minimum realizable amount of the flash light).

The data transmitted from the camera device 1 to the flash device 3 in Step S30 include: a data DV (a signal representing the object distance), a data TV (a signal representing the shutter speed), a data FV (a signal representing the focal length), a data SV (a signal representing the film sensitivity), a data AV (a signal representing the aperture value), a data NOTFIRE (a signal representing whether the flash device is to be fired), a data FLATREQ (a signal for starting the high speed synchronized flash photography), a data FLATTIME (a signal representing a time during which the high speed synchronized flash photography is executed) and a data IVC (a signal representing a pulse light amount). In Step S55, no data is transmitted from the camera to the flash device.

Figure 23:
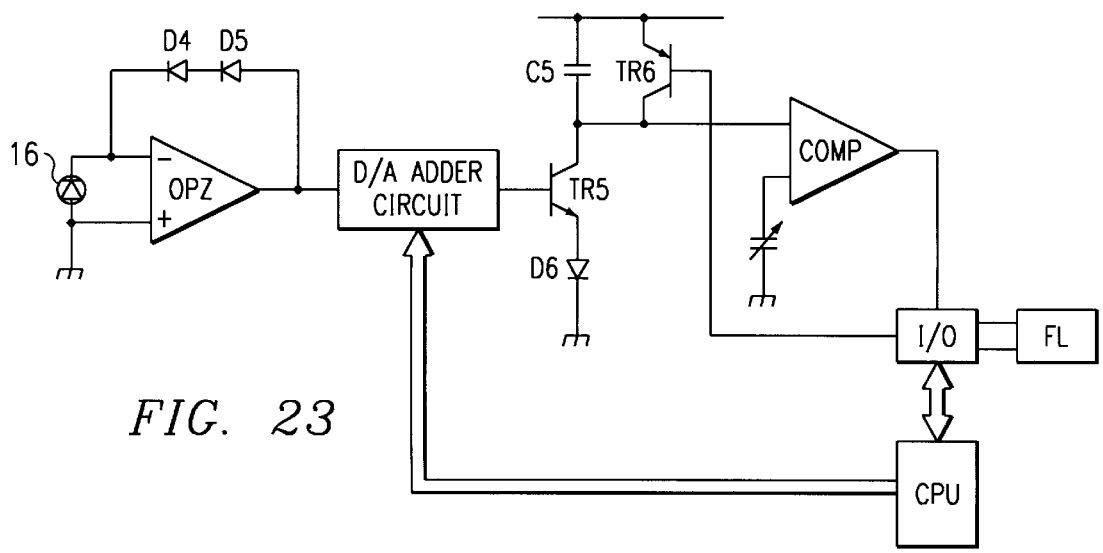
FIG. 23 is a circuit diagram showing a light adjustment circuit.

A light adjustment circuit including the photosensor 16 disposed at the bottom of the camera device is described with reference to FIG. 23. The photosensor 16 which is disposed at the bottom of the camera device 1 to receive a reflection light from the film. A current output from the photosensor 16 is inputted to an operational amplifier OP2. An output current from the operational amplifier OP2 is converted into a voltage logarithmically compressed by diodes D4 and D5. A D/A adder circuit is adapted to adjust the film sensitivity to a set value.

Indicated at TR5 is a transistor for converting the logarithmically compressed output voltage from the operational amplifier OP2 into a logarithmically expanded current.

Indicated at D6 is a diode which is also adapted to convert the logarithmically compressed output voltage from the operational amplifier OP2 into the logarithmically expanded current, similarly to the transistor TR5. Electric charges stored in a capacitor C5 corresponds to the output from the photosensor 16, and the comparator COMP compares the potential stored in this capacitor C5 with a variable power supply to output the flash firing start and stop signals. These signals are sent to the CPU and the flash firing circuit through an I/O circuit (input/output interface).

This light adjustment circuit is also capable of detecting the light intensity. In the case of detecting the light intensity, this circuit may be constructed such that a current flows through the transistor TR6. The current flowing through the transistor TR6 corresponds to the output from the photosensor 20, and the flash photography is executed by comparing this current and the current output from the variable power supply using the comparator COMP.

With this construction, the light intensity control in the first mode can be executed in accordance with the flash photography signal from the light adjustment circuit in the camera.

Figure 24:
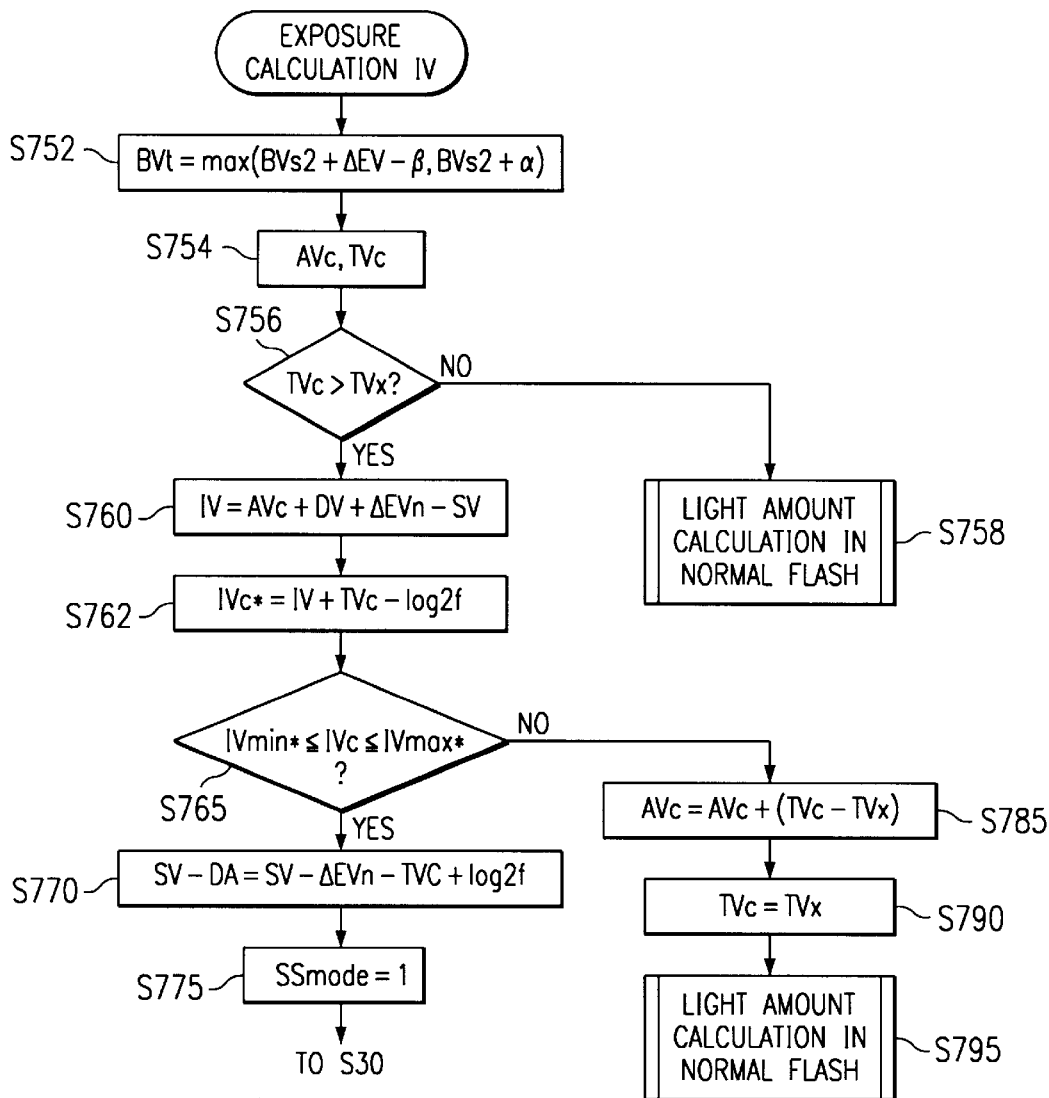
FIG. 24 is a flowchart showing an operation sequence of a subroutine "Exposure Calculation IV" of the system main routine.

The third mode is executed based on the amount of light, in a manner similar to the second mode. Accordingly, the results of the above-mentioned "Exposure Calculation I" and "Exposure Calculation II" will not used for the third mode. FIG. 24 shows operations of an "Exposure Calculation IV" which is to be used in the third mode.

The control aperture value AVc and the control shutter value TVc are determined in Steps S752 and S754 similar to Steps S100 and S105 of the subroutine "Exposure Calculation I" shown in FIG. 9A. Also, operations similar to those of Steps S704 to S715 of the subroutine "Exposure Calculation III" shown in FIG. 20 are executed in Steps S752 to S765. Accordingly, description of the operations of Steps S752 to S765 will be omitted.

If the discrimination result in Step S765 is in the affirmative, a light adjustment level SV–DA (SV–DA=SV–ΔEVn–TVc+$\log_2$f) is calculated based on the film sensitivity SV, the exposure correction amount ΔEVn which is used to correct an exposure amount of the main object during the flash firing, the control shutter speed TVc and the firing frequency f in Step S770. The light adjustment level SV–DA is a reference value per pulse used in a control to start and stop the pulse firing. In Step S775, the high speed synchronization flag is set.

If the discrimination result in Step S765 is in the negative, this subroutine proceeds to Step S785. No description is given to operations executed in Steps S785 and S795 because they are the same as those executed in Steps S730 and S740.

Figure 25:
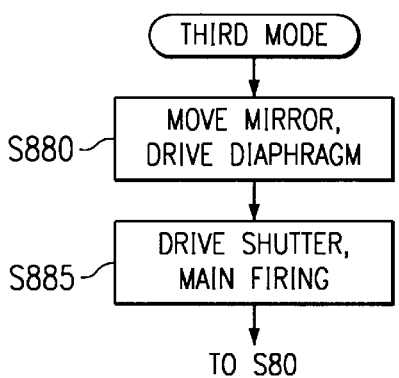
FIG. 25 is a flowchart showing an operation sequence of a subroutine "THIRD MODE" of the high speed synchronized flash photography.

The third high speed synchronized flash photography mode which is to be executed in Step S55 of the main routine will be described with reference to FIG. 25. In Step S880, the mirror 11 is moved to the retracted position and the diaphragm is driven to attain the control aperture value.

In Step S885, the front and rear blinds of the shutter are caused to travel, thereby carrying out the main firing. During the main firing, the light reflected by the object is monitored by the light adjustment circuit disposed in the camera device as described above, and the light emission is started and stopped a specified number of times in accordance with the firing frequency f.

Figure 26:
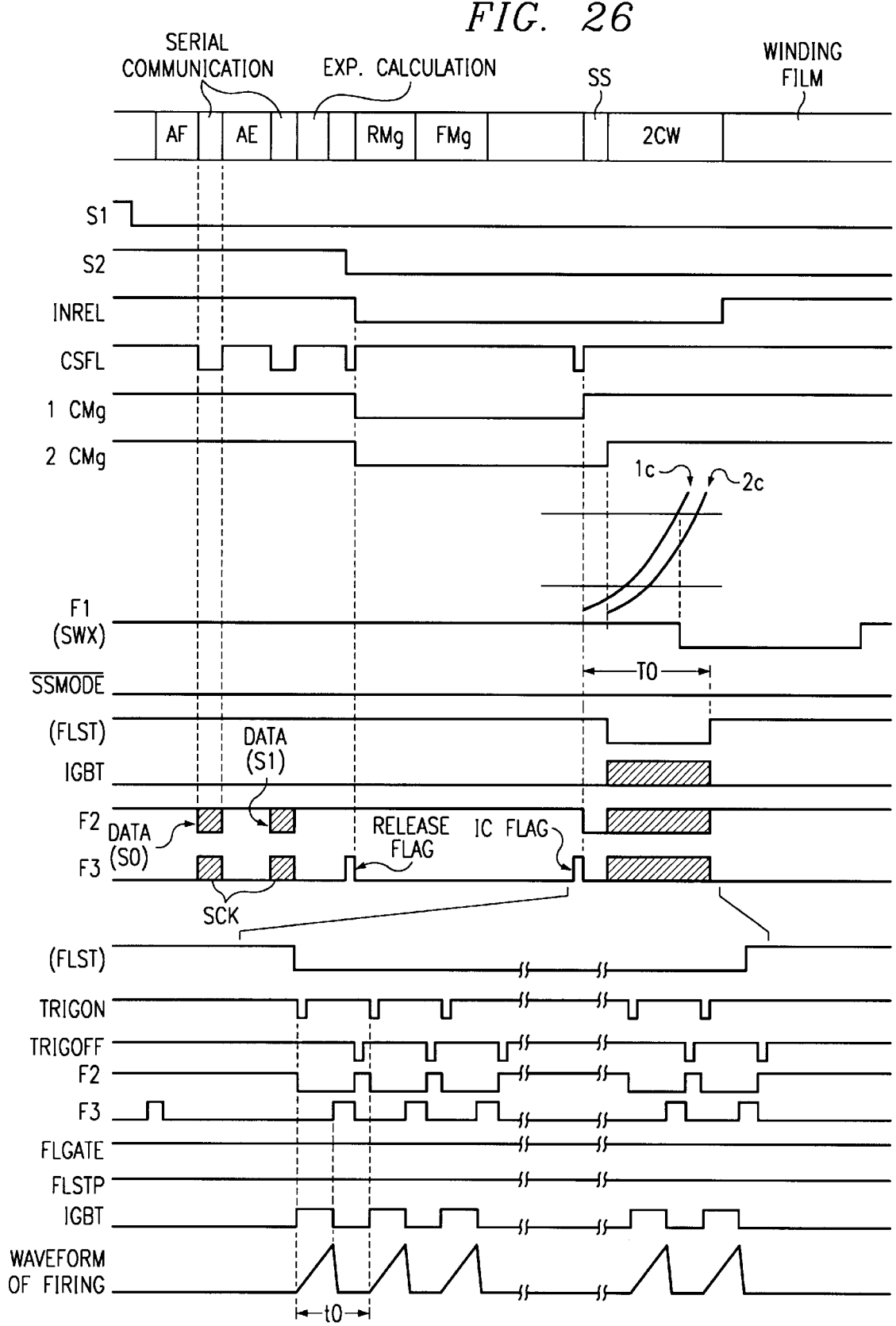
FIG. 26 is a timing chart showing an operational relationship in the third high speed synchronized flash photography mode.

The high speed synchronized flash photography in the third mode is described in more detail with reference to a timing chart shown in FIG. 26. When the light measurement start switchS1 is turned on, the level of the signalS1 becomes "low", thereby the automatic focusing is performed. After the automatic focusing, the data are transmitted from the flash device to the camera (serial communication), followed by the light measurement. The serial communication is the data communication conducted in Step S15, and the data are transmitted through the contact F2. Through the contact F3 is outputted a timing signal (clock) for transmitting the SO data and SI data. The level of the CSFL signal is "low" during the serial communication.

Thereafter, the exposure calculation is performed and the calculation result is transmitted from the camera device 1 to the flash device 3. The above operations are repeated until the release button is operated, i.e., the level of the release signal S2 becomes "low". When the release signal becomes "low", the release flag data is transmitted from the camera to the flash device. The level of the signal INREL is kept "low" until the travel of the rear blind of the shutter is completed after the start of the exposure. When the level of the signal INREL becomes "low", the level of the signal 1 CMg becomes "low" until the front blind starts traveling and the level of the signal 2 CMg becomes "low" until the rear blind starts traveling.

The signal FLST represents, a time tl after the start of the travel of the blinds, the state of the flag in the flash device for representing a time (T0–t1) in synchronism with the fall of the signal F1. After the front blind finishes its travel, a "low" level output is fed from the terminal TRIGON to the set terminal of the flip-flop, which in turn feeds a "high" level out. Since a "high" level output Is fed from the terminal F/PMODE and a "high" level output is fed from the OR4 to the AND2, the level of the IGBT control signal becomes "high", thereby starting the flash firing. Since the level of the signal FLGATE is kept "high" during the flash firing, the transistor TR4 is turned on and the comparator COMP stops operating.

When the photosensor 16 disposed at the bottom of the camera device receives a light after the start of the flash firing, the level of the signal F3 is switched from "low" to "high", thereby a "low" level output is fed from the NAND2 to the AND1. Accordingly, the flip-flop is reset and the level of the IGBT control signal output from the AND2 becomes "low".

Thereafter, the level of the IGBT control signal is kept "low" until the signal TRIGON becomes "low" to set the flip-flop. The high-frequency pulse firing can be continuously carried out by changing the level of the IGBT control signal between "high" and "low" with a high frequency.

Next, the fourth mode of the high speed synchronized flash photography will be described in detail. In the fourth mode as well, the camera device 1 is controlled in accordance with the operation sequence described with reference to FIG. 7.

The contents of data transmitted during the data communication in Steps S15, S30 and S55 are described for each mode with reference to the table shown in FIG. 8. In Step S15, the data are transmitted from the flash device 3 to the camera device 1. The data transmitted in this step include a data IV (a signal representing an amount of flash light), a data SSEN (a signal representing that the flash device is capable of executing the high speed synchronized flash photography), a data IVmax (a signal representing a maximum realizable amount of the flash light) and a data IVmin (a signal representing a minimum realizable amount of the flash light).

The data transmitted from the camera device 1 to the flash device 3 in Step S30 include: a data DV (a signal representing the object distance), a data TV (a signal representing the shutter speed), a data FV (a signal representing the focal length), a data SV (a signal representing the film sensitivity), a data AV (a signal representing the aperture value), a data NOTFIRE (a signal representing whether the flash device 3 is to be fired), a data FLATREQ (a signal for starting the high speed synchronized flash photography), a data FLAT-TIME (a signal representing a time during which the high speed synchronized flash photography is executed) and a data IVC (a signal representing a pulse light amount). In Step S55, no data is transmitted from the camera to the flash device.

The fourth mode uses the subroutine "Exposure Calculation III" which is used in the second mode. Accordingly, no description will be made of the exposure calculation subroutine for the fourth mode.

Figure 27:
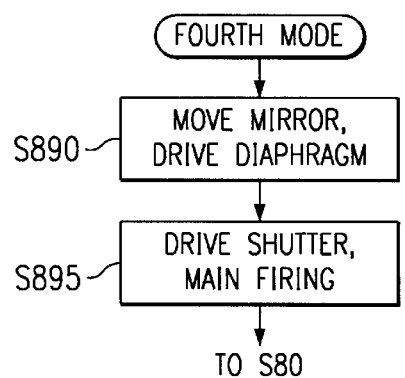
FIG. 27 is a flowchart showing an operation sequence of a subroutine "FOURTH MODE" of the high speed synchronized flash photography.

Next will be described the fourth high speed Synchronized flash photography which is to be executed in Step S55 with reference to FIG. 27. In Step S890, the mirror 11 is moved to the retracted position and the diaphragm is driven to attain the control aperture value. In Step S895, the front and rear blinds of the shutter are caused to travel, thereby carrying out the main firing. During the main firing, the photosensor 34 provided in the flash device 3 detects the amount of the emitted flash light as described above, and the flash firing is stopped when the light amount reaches a proper level calculated in Step S710. The flash firing is started and stopped a specified number of times in accordance with the firing frequency f.

Figure 28:
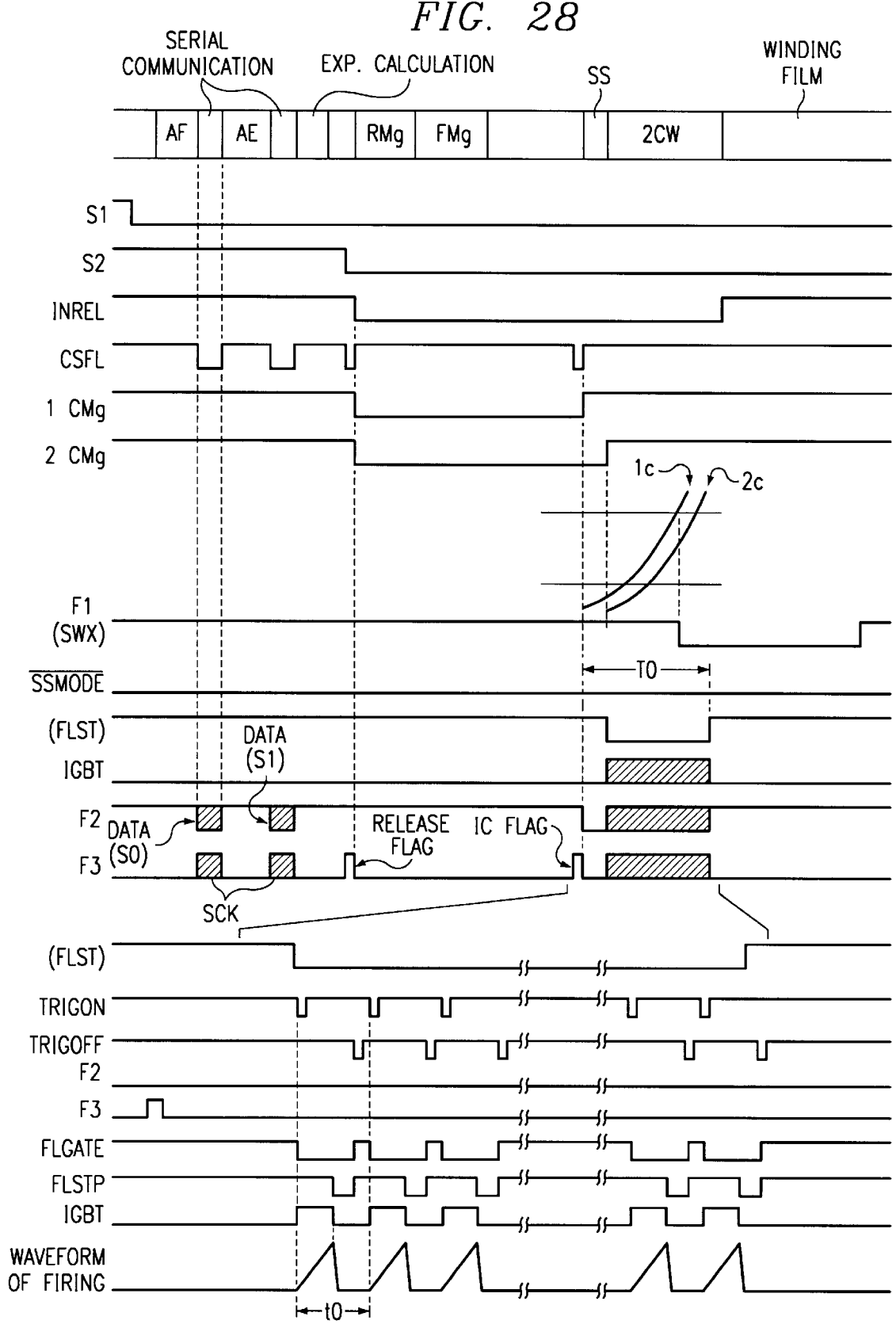
FIG. 28 is a timing chart showing an operational relationship in the fourth high speed synchronized flash photography mode.

The fourth high speed synchronized flash photography will be described in more detail with reference to a timing chart shown in FIG. 28.

When the light measurement start switch S1 is turned on, the level of the signal SS becomes "low", thereby the automatic focusing is performed. After the automatic focusing, the data are transmitted from the flash device 3 to the camera device 1 (serial communication), followed by the light measurement. The serial communication is the data communication conducted in Step S15, and the data are transmitted through the contact F2. Through the contact F3 is outputted a timing signal (clock) for transmitting the SO data and SI data. The level of the CSFL signal is "low" during the serial communication.

Thereafter, the exposure calculation is performed and the calculation result is transmitted from the camera device 1 to the flash device 3. The above operations are repeated until the release button is operated, i.e., the level of the release signal S2 becomes "low". When the release signal becomes "low", the release flag data is transmitted from the camera device 1 to the flash device 3. The level of the signal INREL is kept "low" until the travel of the rear blind of the shutter is completed after the start of the exposure.

When the level of the signal INREL becomes "low", the level of the signal 1 CMg becomes "low" until the front blind starts traveling and the level of the signal 2 CMg becomes "low" until the rear blind starts traveling. The signal FLST represents, a time tl after the start of the travel of the blinds, the state of the flag in the flash device 3 for representing a time (T0–t1) in synchronism with the fall of the signal F1. After the front blind finishes its travel, a "low" level output is fed from the terminal TRIGON to the set terminal of the flip-flop, which in turn feeds a "high" level output. Since a "high" level output is fed from the terminal F/PMODE and a "high" level output is fed from the OR4 to the AND2, the level of the IGBT control signal becomes "high", thereby starting the flash firing. In synchronism with the start of the flash firing, the "low" level output is fed from the terminal FLGATE, with the result that the transistor TR4 is turned off and the comparator COMP starts operating.

Upon the start of the flash firing, the level of the signal FLSTP which is an output from the comparator COMP is switched from "high" to "low". Accordingly, the flip-flop is reset and the level of the IGBT control signal output from the AND2 becomes "low". Thereafter, the level of the IGBT control signal is kept "low" until the level of the signal TRIGON becomes "low" again to thereby set the flip-flop. The high-frequency pulse firing can be continuously carried out by changing the output of the IGBT control signal with a high frequency.

Although the fourth mode is described with respect to the case where the pulse firing is carried out, it may be possible to use the flat flash light emission which is used in the first mode.

Also, It may be appreciated to provide a high speed synchronized flash photography switch or the like on the camera device 1 to render the high speed synchronized flash photography forcibly executed even if, for example, TVc<TVx.

As described above, a flash light is switched between a pulse light and a flat flash light according to an exposure mode. Accordingly, a photographing operation is possible in which a main object can be exposed suitably for a scene to be photographed and an operator's intention to use the respective exposure modes can be properly realized, and the power required for the flash firing can be reduced.

Further, since the flash light is switched between the pulse light and the flat flash light according to a shake prevention shutter speed and a distance to an object, a photographing operation is possible in which the main object can be properly exposed suitably for the scene to be photographed and the camera shake can be prevented, and the power required for the flash firing can be reduced.

Moreover, since the flash light is switched between the pulse light and the flat flash light according to an exposure amount under ambient light, a photographing operation is possible in which the main object can be properly exposed suitably for the scene to be photographed. and the power required for the flash firing can be reduced.

Furthermore, since the flash light is automatically switched among the pulse light, the flat flash light, and the non-flash photography mode, a photographing operation in which the main object can be properly exposed suitably for the scene to be photographed can be left to the camera, and the power required for the flash firing can be reduced.

Further, since the flash light is switched between the pulse light and the flat flash light according to a control shutter speed and a flash synchronized shutter speed, a photographing operation is possible in which the main object can be properly exposed suitably for the scene to be photographed, and the power required for the flash firing can be reduced.

Moreover, at the time of the flash firing carried out for a high speed exposure, an intensity of flash light to be emitted is calculated based on a distance to an object and a brightness of the object illuminated by the flash light emitted in accordance with a reference brightness for an exposure control of the camera and the flat firing is controlled with the calculated light intensity. Accordingly, the exposure can be performed suitably for the scene to be photographed even if the photographing operation is left to the camera. Further, since the operator can be engrossed in the photographing operation, even a novice can easily handle the flash device.

Furthermore, at the time of the flash firing carried out for the high speed exposure, an amount of flash light to be emitted per pulse is calculated based on a total amount of flash light emitted during an exposure time, a control shutter speed during a main firing which is obtained based on an output of a light measurement circuit for detecting the brightness under ambient light, and a firing frequency and the pulse firing is controlled with the calculated light amount. Accordingly, the exposure can be performed suitably for the scene to be photographed even if the photographing operation is left to the camera. Further, since the operator can be engrossed in the photographing operation, even a novice can easily handle the flash device.

Further, at the time of the flash firing carried out for the high speed exposure, the pulse firing is controlled according to an output of a light adjustment circuit for monitoring whether a film is exposed during the main firing up to a reference light adjustment level for controllably starting and stopping the light emission for each pulse during the pulse firing. Accordingly, the exposure can be performed suitably for the scene to be photographed even if the photographing operation is left to the camera. Further, since the operator can be engrossed in the photographing operation, even a novice can easily handle the flash device.

Although the present invention has been fully described by way of example with reference to the accompanying drawings. it Is to be understood that various changes and modifications will be apparent to those skilled in the art. Therefore, unless otherwise such changes and modifications depart from the scope of the present invention, they should be construed as being included therein.

What is claimed is:

1. A camera system comprising:
    a flash device capable of emitting a flash light for an exposure time;
    a first controller communicated with the flash device to render the flash device to emit a test flash light of a predetermined intensity before executing a photography;
    a first photosensor receiving ambient light reflected from an object to measure a first brightness of the object under ambient light;
    a second photosensor receiving ambient light and test flash light reflected from the object to measure a second brightness of the object under the test flash light and ambient light;
    a distance calculator operable to calculate a distance to the object based on the predetermined intensity of the test flash light, the first brightness, and the second brightness;
    a light intensity calculator operable to calculate a light intensity of flash light for the photography based on the calculated distance and a brightness of the object under flash light;
    a focal plane shutter operable to controlledly expose a film, the focal plane shutter including a front blind and a rear blind; and
    a second controller communicated with the flash device to cause the flash device to emit the flash light at the calculated intensity for the exposure time.

2. A camera system as claimed in claim 1, wherein said distance is calculated according to the formula
    $DV = LV_{TEST} - BV1 - \log_2(2^{BV3} - 1)$; wherein
    DV=the distance to said object;
    $LV_{TEST}$=the predetermined intensity of the test flash light;
    BV1=the first brightness;
    BV2=the second brightness; and
    BV3=BV2−BV1.

3. A camera system as claimed in claim 1, wherein said light intensity of flash light for the photography is calculated according to the formula
    LV=BVF+DV; wherein
    LV=the light intensity of flash light for the photography;
    $BV_F$=the brightness of the object under the flash light; and
    DV=the distance.

4. A camera system as claimed in claim 1, wherein said light intensity of the test flash light is detected by a monitor provided in the vicinity of a light emitting portion of said flash device.

5. A camera system as claimed in claim 1, wherein said camera system includes a light receiver which serves both as said first and said second photosensors.

6. A camera system as claimed in claim 5, wherein said light receiver is provided in a camera main body of the camera system.

7. A camera system comprising a camera device and a flash device,
    the camera device including:
        a test firing signal generator communicated with a test firing controller provided in the flash device to transmit a test firing signal to the test firing controller;
        a first photosensor receiving ambient light reflected from an object to measure a first brightness of the object under ambient light;
        a second photosensor receiving ambient light and test flash light reflected from the object to measure a second brightness of the object under the test flash light and ambient light, the test flash light being emitted by the flash device in response to the test firing signal;
        a distance calculator operable to calculate a distance to the object based on the first brightness, the second brightness, and a test flash light intensity to be transmitted from the flash device;
        a light intensity calculator operable to calculate a control light intensity of flash light for a photography based on the calculated distance and a brightness of the object under flash light; and
        a control light intensity transmitter communicated with a main firing controller provided in the flash device to transmit the control light intensity to the main firing controller;
        a main firing signal generator communicated with the main firing controller to transmit a main firing signal to the main firing controller; and
        a shutter controller operable to control the operation of a focal plane shutter provided in the camera device in synchronism with the transmission of the main firing signal;
    the flash device including:
        a flash light emitter capable of emitting a flash light for an exposure time;
        the test firing controller responsive to the test firing signal to cause the flash light emitter to emit the test flash light at the specified intensity;
        the main firing controller responsive to the control light intensity and the main firing signal to cause the flash light emitter to emit the flash light at the control light intensity; and
        a test light intensity transmitter communicated with the distance calculator to transmit-the specified test flash light intensity to the distance calculator.

8. A camera system as claimed in claim 7, wherein said distance is calculated according to the formula
    $DV = LV_{TEST} - BV1 - \log_2(2^{BV3} - 1)$; wherein
    DV=the distance to said object;

$LV_{TEST}$=the test flash light intensity;
BV1=the first brightness;
BV2=the second brightness; and
BV3=BV2−BV1.

9. A camera system as claimed in claim 7, wherein said control light intensity of flash light for the photography is calculated according to the formula $LV=BV_F+DV$; wherein
LV=the control light intensity of the flash light for the photography;
$BV_F$=the brightness of the object under the flash light; and
DV=the distance.

10. A camera system as claimed in claim 7, wherein said test flash light intensity is detected by a monitor provided in the vicinity of a light emitting portion of said flash device.

11. A camera system as claimed in claim 7, wherein said camera system includes a light receiver which serves both of said first and second photosensors.

12. A camera system as claimed in claim 11, wherein said light receiver is provided in the camera device.

13. A camera system comprising:
a test firing signal generator communicated with a test firing controller provided in a flash device to transmit a test firing signal to the test firing controller so as to stimulate the flash device to emit a test flash light;
a light receiver which receives ambient light reflected from an object to measure a first brightness of the object under ambient light, and receives ambient light and the test flash light reflected from the object to measure a second brightness of the object under the test flash light and ambient light, the test flash light being emitted by the flash device in response to the test firing signal;
a distance calculator operable to calculate a distance to the object based on the first brightness, the second brightness and a test flash light intensity to be transmitted from the flash device;
a light intensity calculator operable to calculate a control light intensity of flash light for photography based on the calculated distance and a brightness of the object under flash light;
a control light intensity transmitter communicated with a main firing controller provided in the flash device to transmit the control light intensity to the main firing controller;
a main firing signal generator communicated with the main firing controller to transmit a main firing signal to the main firing controller so as to stimulate the flash device to emit main flash light; and
a shutter controller operable to control the operation of a focal plane shutter provided in the camera system in synchronism with the transmission of the main firing signal.

14. A camera system as claimed in claim 13, wherein said distance is calculated according to the formula $DV=LV_{TEST}-BV1-\log_2(2^{BV3}-1)$; wherein
DV=the distance;
$LV_{TEST}$=the test flash light intensity;
BV1=the first brightness;
BV2=the second brightness; and
BV3=BV2−BV1.

15. A camera system as claimed in claim 13, wherein said control light intensity of flash light for the photography is calculated according to the formula $LV=BV_F+DV$; wherein
LV=the control light intensity of flash light for the photography;
$BV_F$=the brightness of the object under flash light; and
DV=the distance.

16. A camera system comprising:
a flash light emitter which emits a test flash light toward an object, said test flash light having an intensity;
a distance calculator operable to calculate a distance to the object based on an intensity of light coming from the object during the emission of the test flash light;
a controller which controls said flash light emitter to emit main light toward the object with a light intensity which is calculated according to the distance calculated by said distance calculator; and
a light receiver which receives ambient light and the test flash light, and a brightness calculator which calculates a first object brightness with the ambient light and a second brightness with a mixture of the ambient light and the test flash light, and wherein said distance calculator calculates the distance based on the first brightness, second brightness and the test flash light intensity.

17. A camera system as claimed in claim 16, wherein said light intensity of the test flash light is detected by a monitor provided in the vicinity of a light emitting portion of said flash light emitter.

18. A camera system as claimed in claim 16, wherein the distance calculator includes:
a light intensity calculator operable to calculate a light intensity for the main emission based on the calculated distance.

* * * * *